United States Patent
Nagasaka et al.

(10) Patent No.: US 10,477,434 B2
(45) Date of Patent: Nov. 12, 2019

(54) RADIO TERMINAL, PROCESSOR AND COMMUNICATION METHOD

(71) Applicant: KYOCERA CORPORATION, Kyoto (JP)

(72) Inventors: Yushi Nagasaka, Ritto (JP); Masato Fujishiro, Yokohama (JP); Hiroyuki Adachi, Kawasaki (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/881,840

(22) Filed: Jan. 29, 2018

(65) Prior Publication Data
US 2018/0152862 A1 May 31, 2018

Related U.S. Application Data

(63) Continuation of application No. PCT/JP2016/072431, filed on Jul. 29, 2016.
(Continued)

(51) Int. Cl.
*H04W 48/18* (2009.01)
*H04W 28/08* (2009.01)
(Continued)

(52) U.S. Cl.
CPC ........... *H04W 28/08* (2013.01); *H04W 36/22* (2013.01); *H04W 48/18* (2013.01); *H04W 28/0231* (2013.01); *H04W 92/02* (2013.01)

(58) Field of Classification Search
CPC ..... H04W 28/08; H04W 36/22; H04W 48/18; H04W 92/02; H04W 28/0231
See application file for complete search history.

(56) References Cited

U.S. PATENT DOCUMENTS

| | | | |
|---|---|---|---|
| 2015/0365868 A1* | 12/2015 | Chang | H04W 48/18 370/230 |
| 2016/0249285 A1* | 8/2016 | Fujishiro | H04W 48/08 |
| 2016/0323903 A1* | 11/2016 | Fujishiro | H04W 48/16 |

FOREIGN PATENT DOCUMENTS

| | | |
|---|---|---|
| WO | 2014/112595 A1 | 7/2014 |
| WO | 2015/046267 A1 | 4/2015 |
| WO | 2015/093569 A1 | 6/2015 |

OTHER PUBLICATIONS

Samsung; Handling of dedicated signalling during cell re-selection/handover; 3GPP TSG-RAN2 Meeting #86; R2-143385; Aug. 18-22, 2014; 3 pages; Dresden, Germany.
(Continued)

*Primary Examiner* — Lakeram Jangbahadur
(74) *Attorney, Agent, or Firm* — Studebaker & Brackett PC

(57) ABSTRACT

A radio terminal according to an embodiment comprises: a controller configured to control traffic steering between an Evolved-Universal Terrestrial Radio Access Network (E-UTRAN) and a Wireless Local Area Network (WLAN). The controller is configured to control traffic steering from the E-UTRAN to the WLAN or from the WLAN to the E-UTRAN according to at least one of a first scheme and a second scheme. The radio terminal further comprises a receiver configured to receive, from the E-UTRAN, first assistance information to be used to determine whether the radio terminal executes the traffic steering in the first scheme. The first assistance information is broadcasted by the E-UTRAN. The receiver is configured to receive, from the E-UTRAN, WLAN configuration information including a list of identifiers of the WLAN and a timer value indicating a period over which the WLAN configuration information should be held.

10 Claims, 13 Drawing Sheets

FIG. 1

Related U.S. Application Data

(60) Provisional application No. 62/198,893, filed on Jul. 30, 2015.

(51) Int. Cl.
    *H04W 36/22*     (2009.01)
    *H04W 28/02*     (2009.01)
    *H04W 92/02*     (2009.01)

(56) References Cited

OTHER PUBLICATIONS

Kyocera; UE behaviour for LTE-WLAN interworking enhancements; 3GPP TSG-RAN WG2 #93; R2-161515; Feb. 15-19, 2016; 6 pages; St. Julian's, Malta.
International Search Report issued in PCT/JP2016/072431; dated Oct. 18, 2016.
Catt; Considerations on Interworking Enhancements; 3GPP TSG RAN2 Meeting #90; R2-152128; May 25-29, 2015 3 pages; Fukuoka, Japan.
Nokia Networks; Traffic steering command for Rel-13 WLAN Interworking; 3GPP TSG-RAN WG2 #90; R2-152109; May 25-29, 2015; 3 pages; Fukuoka, Japan.
MediaTek Inc.; Traffic steering procedure and command for NCIWK; 3GPP TSG-RAN2 #90 Meeting; R2-152139; May 25-29, 2015; 3 pages; Fukuoka, Japan.
Broadcom Corporation; Signalling aspects for WLAN/3GPP in E-UTRA; 3GPP TSG-RAN WG2 #86; R2-142064; May 19-23, 2014; 6 pages; Seoul, South Korea.

* cited by examiner

FIG. 8

```
MeasConfig ::=                          SEQUENCE {
    -- Measurement objects
    measObjectToRemoveList          MeasObjectToRemoveList          OPTIONAL,    -- Need ON
    measObjectToAddModList          MeasObjectToAddModList          OPTIONAL,    -- Need ON
...
```

```
MeasObjectToAddModList ::=              SEQUENCE (SIZE (1..maxObjectId)) OF MeasObjectToAddMod
```

```
MeasObjectToAddMod ::=  SEQUENCE {
    measObjectId                    MeasObjectId,
    measObject                      CHOICE {
        measObjectEUTRA                 MeasObjectEUTRA,
        measObjectUTRA                  MeasObjectUTRA,
        measObjectGERAN                 MeasObjectGERAN,
        measObjectCDMA2000              MeasObjectCDMA2000,
        measObjectWLAN                  MeasObjectWLAN,
        ...
    }
}
```

```
MeasObjectWLAN ::=                  SEQUENCE {
    wlancarrierFreq                 ENUMERATED {GHz2.4, GHz5.0},        -- Need ON
    wlansToRemoveList               WlanIndexList           OPTIONAL,   -- Need ON
    wlansToAddModList               WlansToAddModList       OPTIONAL,   -- Need ON
    WlansToAddModList ::=           SEQUENCE (SIZE (1.. maxWLAN-Id-r13)) OF WlansToAddMod
    WlansToAddMod ::=   SEQUENCE {
        wlanIndex                       INTEGER (1.. maxWLAN-Id-r13),
        wlan-Identifiers-r13            Wlan-Identifiers-r13
    }
}
```

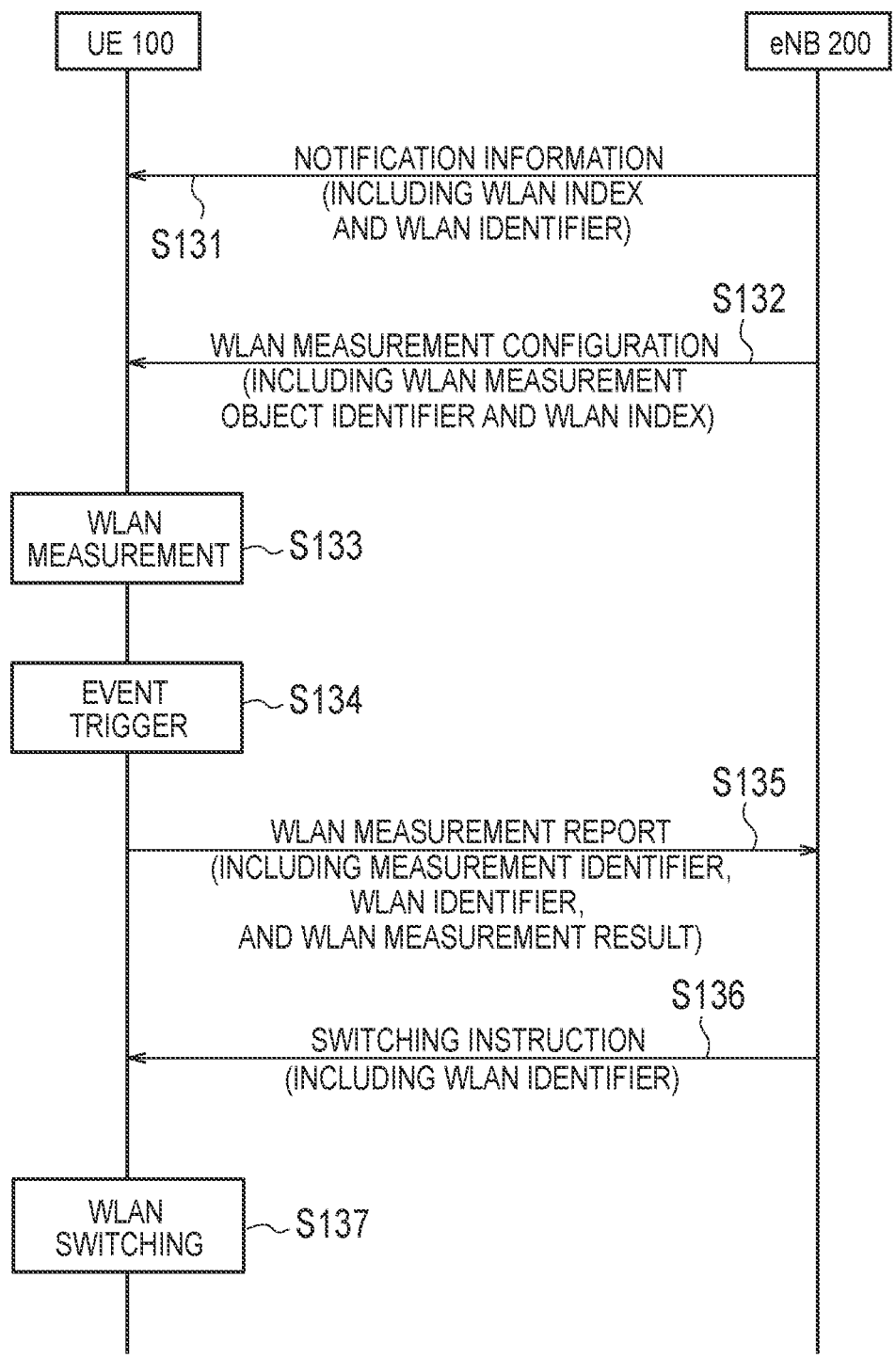

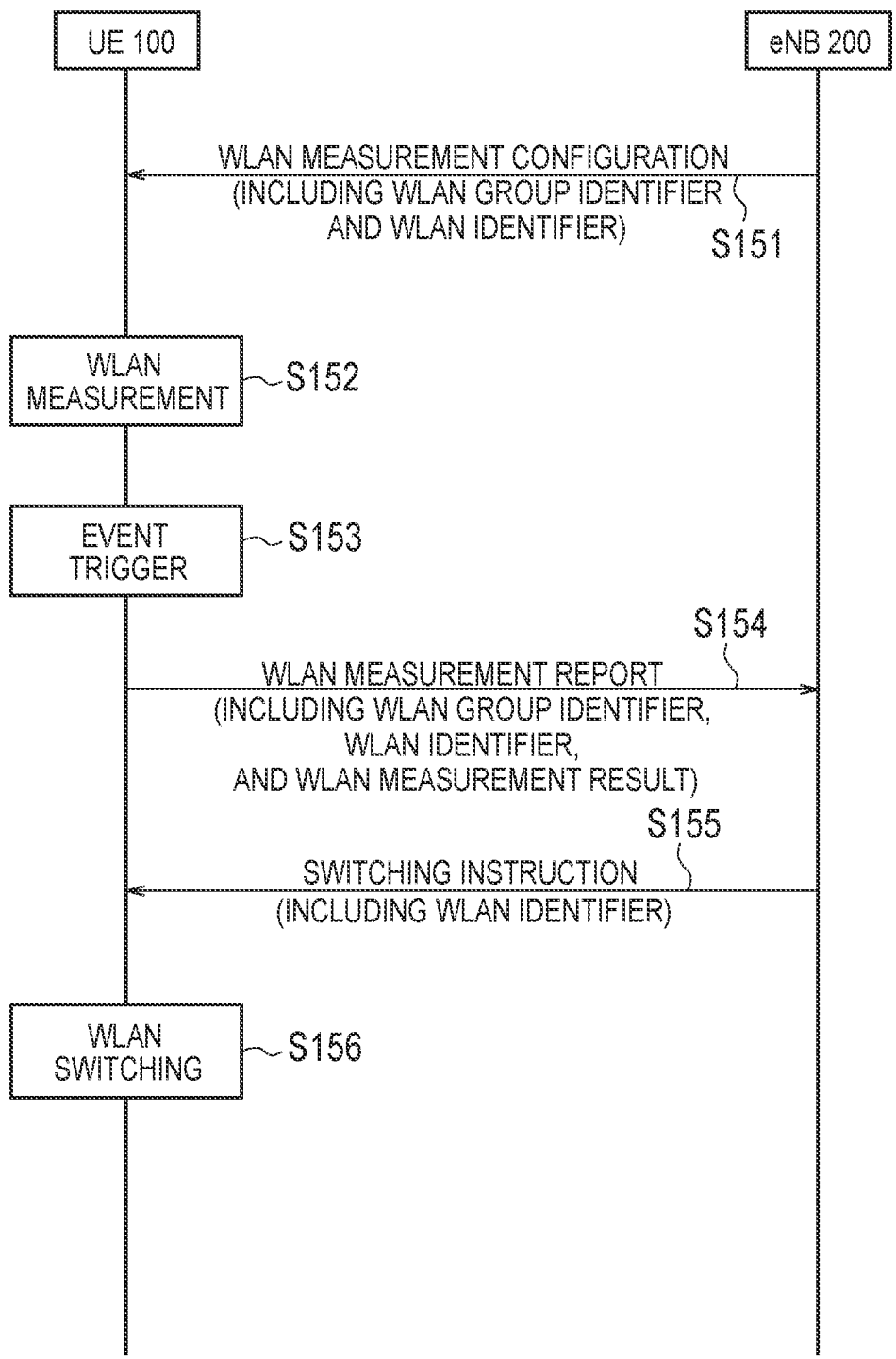

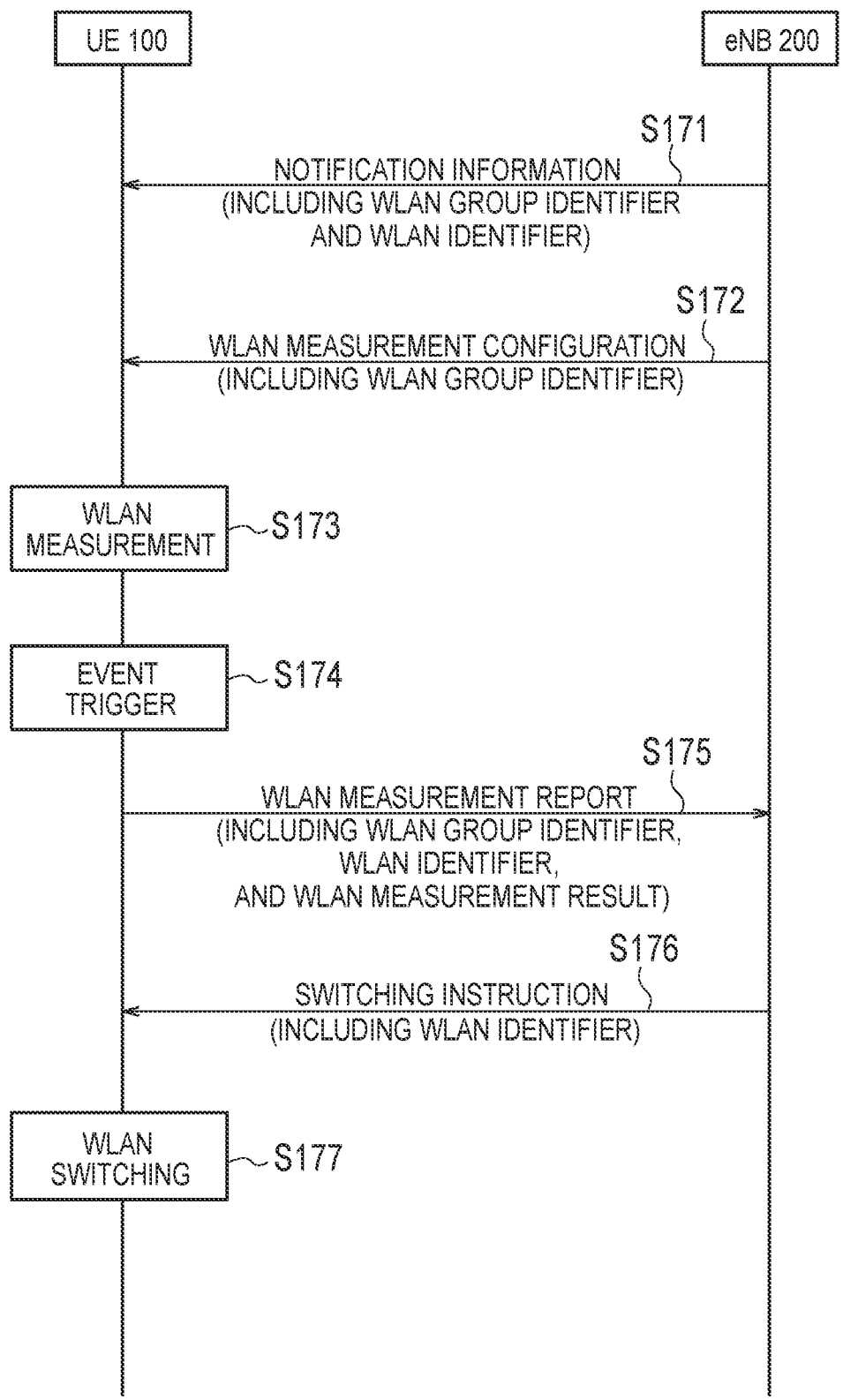

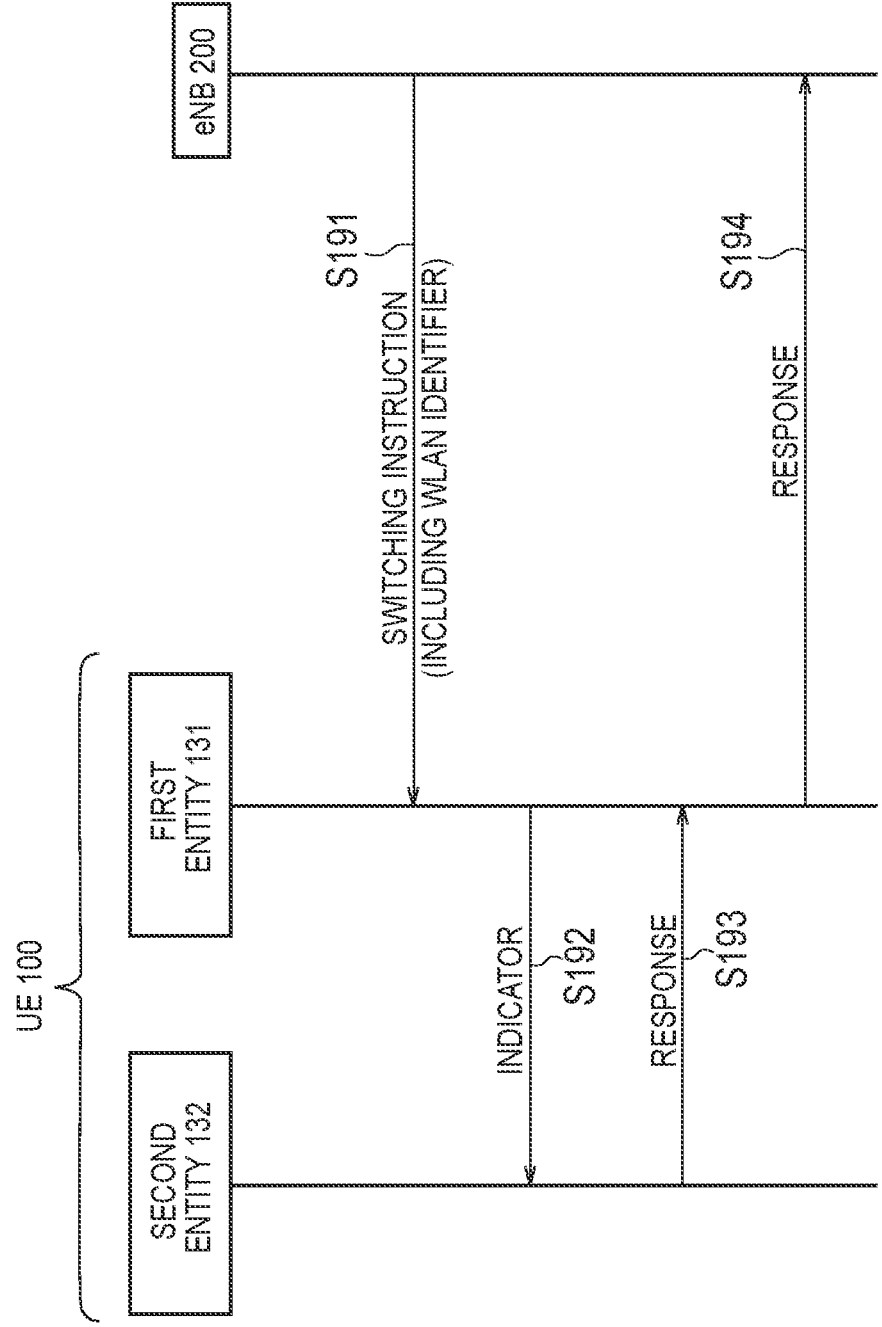

FIG. 14

```
wlan-SteeringCommand ::=    SEQUENCE {
    WLAN-Id-r13                WLAN-Id-List-r12,
    steeringState              ENUMERATED {toLTE,toWLAN,null}
}
```

RADIO TERMINAL, PROCESSOR AND COMMUNICATION METHOD

RELATED APPLICATIONS

This application is a continuation application of international application PCT/JP2016/072431, filed Jul. 29, 2016, which claims benefit of U.S. Provisional Application 62/198,893, filed Jul. 30, 2015, the entirety of all applications hereby expressly incorporated by reference.

TECHNICAL FIELD

The present disclosure relates to a radio terminal and a processor.

BACKGROUND ART

In recent years, radio terminals compatible with both wireless wide area network (WWAN) communication and wireless local area network (WLAN) communication have been becoming widespread. In order to provide high-speed and large-capacity communication services to such radio terminals, technology for enhancing interworking between the WWAN and the WLAN is being studied.

SUMMARY

A radio terminal according to an embodiment comprises: a controller configured to control traffic steering between an Evolved-Universal Terrestrial Radio Access Network (E-UTRAN) and a Wireless Local Area Network (WLAN). The controller is configured to control traffic steering from the E-UTRAN to the WLAN or from the WLAN to the E-UTRAN according to at least one of a first scheme and a second scheme. The traffic steering means switching traffic of the radio terminal from one network to another network. In the first scheme, the controller is configured to control the traffic steering with assistance of the E-UTRAN. In the second scheme, the controller is configured to control the traffic steering in response to an instruction from the E-UTRAN. The radio terminal further comprises a receiver configured to receive, from the E-UTRAN, first assistance information to be used to determine whether the radio terminal executes the traffic steering in the first scheme. The first assistance information is broadcasted by the E-UTRAN. The receiver is configured to receive, from the E-UTRAN, WLAN configuration information including a list of identifiers of the WLAN and a timer value indicating a period over which the WLAN configuration information should be held.

A processor according to an embodiment is a processor configured to control a radio terminal. The processor is configured to perform a process of controlling traffic steering between an Evolved-Universal Terrestrial Radio Access Network (E-UTRAN) and a Wireless Local Area Network (WLAN). In the process, the processor is configured to control traffic steering from the E-UTRAN to the WLAN or from the WLAN to the E-UTRAN according to at least one of a first scheme and a second scheme. The traffic steering means switching traffic of the radio terminal from one network to another network. In the first scheme, the processor is configured to control the traffic steering with the assistance of the E-UTRAN. In the second scheme, the processor is configured to control the traffic steering in response to an instruction from the E-UTRAN. The processor is configured to perform: a process of receiving, from the E-UTRAN, first assistance information to be used to determine whether the radio terminal executes the traffic steering in the first scheme; and a process of receiving, from the E-UTRAN, WLAN configuration information including a list of identifiers of the WLAN and a timer value indicating a period over which the WLAN configuration information should be held. The first assistance information is broadcasted by the E-UTRAN.

A communication method according to an embodiment comprises: controlling, by a radio terminal, traffic steering between an Evolved-Universal Terrestrial Radio Access Network (E-UTRAN) and a Wireless Local Area Network (WLAN). In the controlling, the radio terminal controls traffic steering from the E-UTRAN to the WLAN or from the WLAN to the E-UTRAN according to at least one of a first scheme and a second scheme. The traffic steering means switching traffic of the radio terminal from one network to another network. In the first scheme, the radio terminal controls the traffic steering with assistance of the E-UTRAN. In the second scheme, the radio terminal controls the traffic steering in response to an instruction from the E-UTRAN. The communication method further comprises: broadcasting, by the E-UTRAN, first assistance information to be used to determine whether the radio terminal executes the traffic steering in the first scheme; and receiving, by the radio terminal, the first assistance information from the E-UTRAN. The communication method further comprises: transmitting, by the E-UTRAN, WLAN configuration information including a list of identifiers of the WLAN and a timer value indicating a period over which the WLAN configuration information should be held; and receiving, by the radio terminal, the WLAN configuration information and the timer value from the E-UTRAN.

BRIEF DESCRIPTION OF DRAWINGS

FIG. 8 is a diagram illustrating a specific example of a WLAN measurement configuration in the operation pattern 1A of the base station-based scheme according to an embodiment.

FIG. 9 is a sequence diagram illustrating an operation pattern 1B of the base station-based scheme according to an embodiment.

FIG. 10 is a sequence diagram illustrating an operation pattern 2A of the base station-based scheme according to an embodiment.

FIG. 11 is a sequence diagram illustrating an operation pattern 2B of the base station-based scheme according to an embodiment.

FIG. 12 is a sequence diagram illustrating an operation of a UE having received a switching instruction according to an embodiment.

FIG. 14 is a diagram for describing an example of a steering command.

DESCRIPTION OF EMBODIMENTS

Overview of Embodiment

Figure 1:
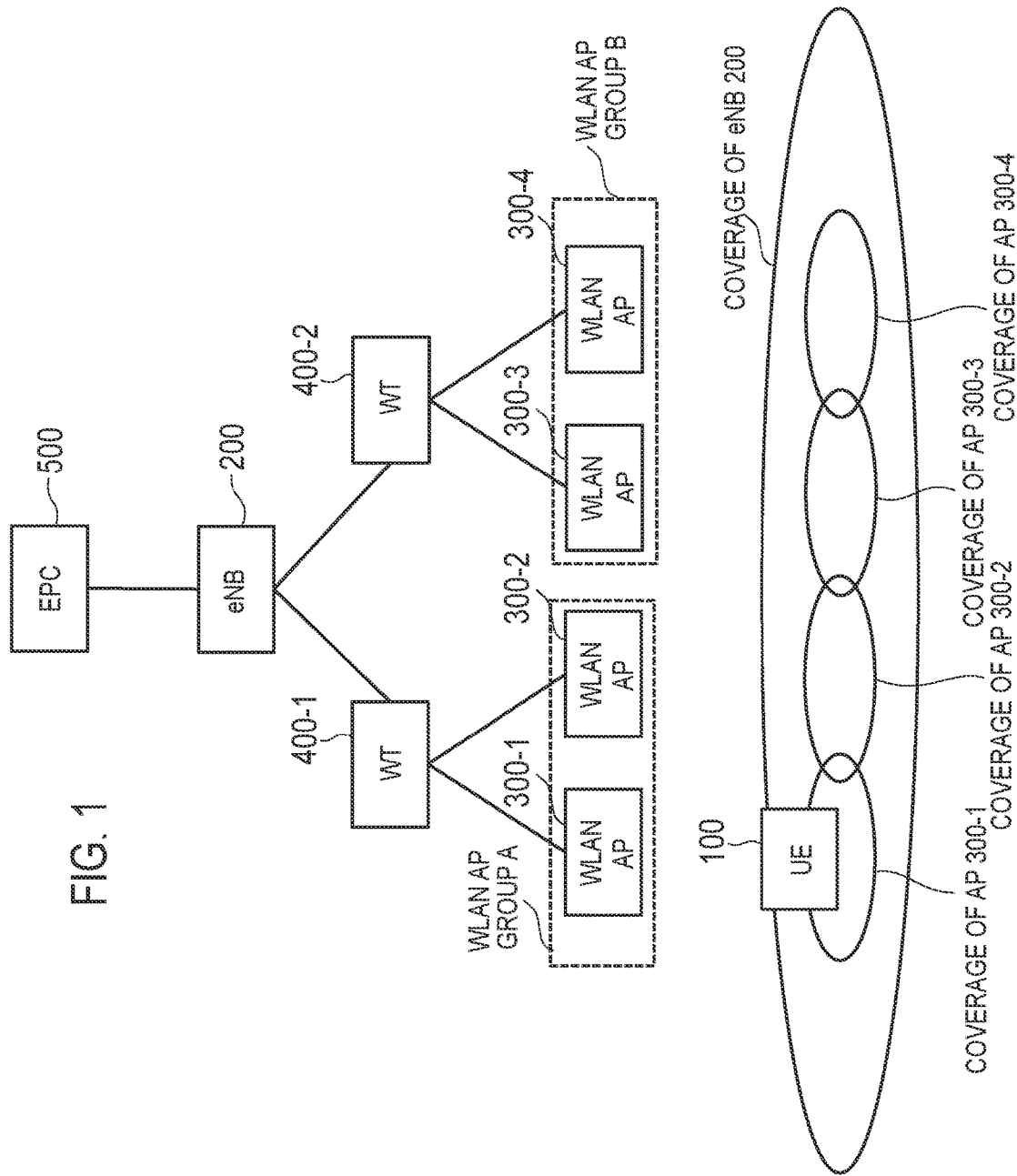
FIG. 1 is a diagram illustrating architecture of a communication system according to an embodiment.

A radio terminal according to an embodiment comprises: a controller configured to control traffic steering between an Evolved-Universal Terrestrial Radio Access Network (E-UTRAN) and a Wireless Local Area Network (WLAN). The controller is configured to control traffic steering from the E-UTRAN to the WLAN or from the WLAN to the E-UTRAN according to at least one of a first scheme and a second scheme. The traffic steering means switching traffic of the radio terminal from one network to another network. In the first scheme, the controller is configured to control the traffic steering with assistance of the E-UTRAN. In the second scheme, the controller is configured to control the traffic steering in response to an instruction from the E-UTRAN. The radio terminal further comprises a receiver configured to receive, from the E-UTRAN, first assistance information to be used to determine whether the radio terminal executes the traffic steering in the first scheme. The first assistance information is transmitted in a broadcast manner by the E-UTRAN. The receiver is configured to receive a WLAN measurement configuration to be used for the WLAN measurement by the radio terminal.

The controller may control the traffic steering according to the first scheme in response to the fact that the radio terminal is in an RRC idle mode.

The controller may control the traffic steering according to the first scheme until the controller receives the instruction.

The controller may stop controlling the traffic steering according to the first scheme in response to the reception of the instruction.

The controller may prioritize the instruction over a result of the determination based on the first assistance information.

The controller may have an upper entity. The instruction may be configured to indicate switching from the E-UTRAN to the WLAN, and may comprise an identifier related to the WLAN. The controller may notify the upper entity of an indicator indicating switching from the E-UTRAN to the WLAN together with the identifier related to the WLAN.

The upper entity may determine whether to switch from the E-UTRAN to the WLAN, in response to reception of the indicator.

The first assistance information may comprise an identifier related to the WLAN. The controller may control the traffic steering by using the identifier related to the WLAN, based on radio quality in the WLAN and the E-UTRAN.

The controller may execute the traffic steering from the E-UTRAN to the WLAN according to the instruction. The radio terminal further comprises a transmitter configured to transmit, to the E-UTRAN, an acknowledge relay or a negative rely to the instruction.

The WLAN measurement configuration comprises a frequency of a WLAN which is the WLAN measurement object, a list of identifiers of WLANs to be added to the WLAN measurement object, and a list of identifiers of WLANs to be removed from the WLAN measurement object.

The frequency of the WLAN comprises a frequency of 2.5 GHz and a frequency of 5 GHz.

A processor according to an embodiment is a processor configured to control a radio terminal. The processor is configured to perform a process of controlling traffic steering between an Evolved-Universal Terrestrial Radio Access Network (E-UTRAN) and a Wireless Local Area Network (WLAN). In the process, the processor is configured to control traffic steering from the E-UTRAN to the WLAN or from the WLAN to the E-UTRAN according to at least one of a first scheme and a second scheme. The traffic steering means switching traffic of the radio terminal from one network to another network. In the first scheme, the processor is configured to control the traffic steering with the assistance of the E-UTRAN. In the second scheme, the processor is configured to control the traffic steering in response to an instruction from the E-UTRAN. The processor is configured to perform: a process of receiving, from the E-UTRAN, first assistance information to be used to determine whether the radio terminal executes the traffic steering in the first scheme; and a process of receiving a WLAN measurement configuration to be used for the WLAN measurement by the radio terminal. The first assistance information is transmitted in a broadcast manner by the E-UTRAN.

Please note that the present specification includes below contents.

A radio terminal according to an embodiment may perform communication with a wireless wide area network (WWAN)-supporting base station by a WWAN. The radio terminal may comprise: a controller configured to perform data communication by using a network selected by at least one scheme of a terminal-based scheme in which the radio terminal autonomously performs a network selection to select the WWAN or a wireless local area network (WLAN) as a network to be used for the data communication of the radio terminal and a base station-based scheme in which the WWAN-supporting base station performs the network selection based on a result of WLAN measurement of the radio terminal. The controller may perform a process of receiving first assistance information that is transmitted from the WWAN-supporting base station by broadcast signaling and is used in the terminal-based scheme by the radio terminal, and a process of receiving a WLAN measurement configuration that is transmitted from the WWAN-supporting base station by dedicated signaling addressed to the radio terminal and is used for the WLAN measurement in the base station-based scheme by the radio terminal.

If the radio terminal is in an idle mode of the WWAN, the controller may perform the network selection of the terminal-based scheme based on the first assistance information.

If the radio terminal is in a connected mode of the WWAN, the controller may perform the network selection of the terminal-based scheme based on the first assistance information in a predetermined WLAN access point group. The predetermined WLAN access point group may comprise at least one WLAN-supporting access point.

If a WLAN access point group different from the predetermined WLAN access point group is discovered, the controller may perform the WLAN measurement of the base station-based scheme based on the WLAN measurement configuration.

The controller may prohibit the WLAN measurement of the base station-based scheme based on the WLAN measurement configuration until the different WLAN access point group is discovered.

If the radio terminal receives the WLAN measurement configuration in a connected mode of the WWAN, the controller may perform the WLAN measurement of the base station-based scheme based on the WLAN measurement configuration, without applying the network selection of the terminal-based scheme based on the first assistance information.

Each of the first assistance information and the WLAN measurement configuration comprises a WLAN identifier. If the radio terminal is in a connected mode of the WWAN, the controller may control not to apply the network selection of the terminal-based scheme based on the first assistance information with respect to a WLAN identifier that overlaps the WLAN measurement configuration among WLAN identifiers included in the first assistance information.

The controller may further perform a process of receiving second assistance information that is transmitted from the WWAN-supporting base station by dedicated signaling addressed to the radio terminal and is used in the terminal-based scheme.

A WLAN access point group in which the radio terminal is capable of autonomously performing switching between WLAN-supporting access points is defined. If the radio terminal is in a connected mode of the WWAN, the controller may perform the network selection of the terminal-based scheme based on the second assistance information in a predetermined WLAN access point group.

If a WLAN access point group different from the predetermined WLAN access point group is discovered, the controller may perform the WLAN measurement of the base station-based scheme based on the WLAN measurement configuration.

If the radio terminal is in a connected mode of the WWAN, the controller may perform control not to apply the network selection of the terminal-based scheme based on the first assistance information or the second assistance information after a condition for reporting, to the WWAN-supporting base station, a result of the WLAN measurement based on the WLAN measurement configuration is satisfied.

A radio terminal according to an embodiment may perform communication with a wireless wide area network (WWAN) base station by a WWAN. The radio terminal may comprise: a controller configured to perform data communication by using a network selected by at least one scheme of a terminal-based scheme in which the radio terminal autonomously performs a network selection to select one of a WWAN and a wireless local area network (WLAN) as a network to be used for the data communication of the radio terminal and a base station-based scheme in which the WWAN-supporting base station performs the network selection based on a result of WLAN measurement of the radio terminal. The controller may perform a process of transmitting, to the WWAN-supporting base station, request information requesting transmission of assistance information that is used in the terminal-based scheme by the radio terminal or transmission of a WLAN measurement configuration that is used in the base station-based scheme by the radio terminal.

The request information may comprise information specifying at least one of the terminal-based scheme and the base station-based scheme.

A wireless wide area network (WWAN)-supporting base station according to an embodiment may perform WWAN communication with a radio terminal. The WWAN-supporting base station may comprise: a controller configured to perform data communication by using a network selected by at least one scheme of a terminal-based scheme in which the radio terminal autonomously performs a network selection to select a WWAN or a wireless local area network (WLAN) as a network to be used for the data communication of the radio terminal and a base station-based scheme in which the WWAN-supporting base station performs the network selection based on a result of WLAN measurement of the radio terminal. The controller may perform a process of transmitting first assistance information by broadcasting signaling, the first assistance information being used in the terminal-based scheme by the radio terminal, and a process of transmitting a WLAN measurement configuration by dedicated signaling addressed to the radio terminal, the WLAN measurement configuration being used for the WLAN measurement in the base station-based scheme by the radio terminal.

In response to receiving, from the radio terminal, request information requesting the transmission of the WLAN measurement configuration, the controller may transmit the WLAN measurement configuration by dedicated signaling addressed to the radio terminal.

The controller may further perform a process of transmitting second assistance information by dedicated signaling addressed to the radio terminal, the second assistance information being used in the terminal-based scheme by the radio terminal.

In response to receiving, from the radio terminal, request information requesting the transmission of the second assistance information, the controller may transmit the second assistance information by dedicated signaling addressed to the radio terminal.

Embodiment

An embodiment will be described below.

In the embodiment, an example in which a WWAN system is a Long Term Evolution (LTE) system will be described. The LTE system is a system of which the specifications are formulated in the 3rd Generation Partnership Project (3GPP) that is a standardization project.

(System Architecture)

FIG. 1 is a diagram illustrating an architecture of a communication system according to an embodiment.

As illustrated in FIG. 1, the communication system according to the embodiment includes a user equipment (UE) 100, an evolved Node-B (eNB) 200, a WLAN-supporting access point (WLAN AP) 300, a WLAN termination (WT) 400, and an evolved packet core (EPC) 500. The UE 100 corresponds to a radio terminal. The eNB 200 corresponds to a WWAN-supporting base station. The eNB 200 and the EPC 500 constitute a WWAN (LTE network). The WLAN AP 300 and the WT 400 constitute a WLAN. However, the communication system may not include the WT 400.

The UE 100 is a mobile apparatus compatible with both WWAN communication (LTE communication) and WLAN communication. The UE 100 supports WWAN/WLAN cooperation technology. The architecture of the UE 100 will be described later.

The eNB 200 is an apparatus that manages one or more cells and performs LTE communication with the UE 100 connected to the cell. The architecture of the UE 100 will be described later.

The eNB 200 constitutes an Evolved-Universal Terrestrial Radio Access Network (E-UTRAN). The eNB 200 is connected to a neighbour eNB via an X2 interface. The eNB 200 has a radio resource management (RRM) function, a user data (hereinafter, simply referred to as "data") routing function, a measurement control function for mobility control and scheduling, and the like. The architecture of the eNB 200 will be described later. It is noted that the "cell" is used as the term indicating a minimum unit of a radio communication area (coverage) and is also used as the term indicating a function of performing radio communication with the UE 100.

The WLAN AP 300 is an apparatus that performs WLAN communication with the UE 100 connected to the WLAN AP. FIG. 1 illustrates an example in which four WLAN APs 300-1 to 300-4 are provided within the cell coverage of the eNB 200. It is noted that the eNB 200 may also have the function of the WLAN AP. Such a scenario is referred to as a collocated scenario.

The WT 400 is an apparatus that terminates an Xw interface which is a direct interface with the eNB 200. The WT 400 accommodates a plurality of WLAN APs 300. FIG. 1 illustrates an example in which a WT 400-1 accommodates two WLAN APs 300-1 and 300-2 and a WT 400-2 accommodates two WLAN APs 300-3 and 300-4.

Further, in the embodiment, the WLAN APs 300-1 and 300-2 constitute a WLAN AP group A. The WLAN APs 300-3 and 300-4 constitute a WLAN AP group B. FIG. 1 illustrates an example in which the WLAN AP group is constituted by the WLAN APs 300 accommodated in the same WT 400. However, the WLAN AP group may be constituted by the WLAN APs 300 accommodated in different WTs 400.

Here, the WLAN AP group is a group that enables the UE 100 to autonomously perform switching control between the WLAN APs 300 independently of the instruction of the eNB 200. The UE 100 can switch the WLAN communication from one WLAN AP to another WLAN AP within the same WLAN AP group by using a WLAN mobility control function, even if there is no instruction from the eNB 200. On the other hand, switching between different WLAN AP groups is controlled by the eNB 200.

The EPC 500 is connected to the eNB 200 via an S1 interface. The EPC 500 corresponds to a core network. The EPC 500 includes a mobility management entity (MME) and a serving-gateway (S-GW). The MME performs various types of mobility control or the like on the UE 100. The S-GW performs data transfer control.

(LTE Protocol)

Figure 2:
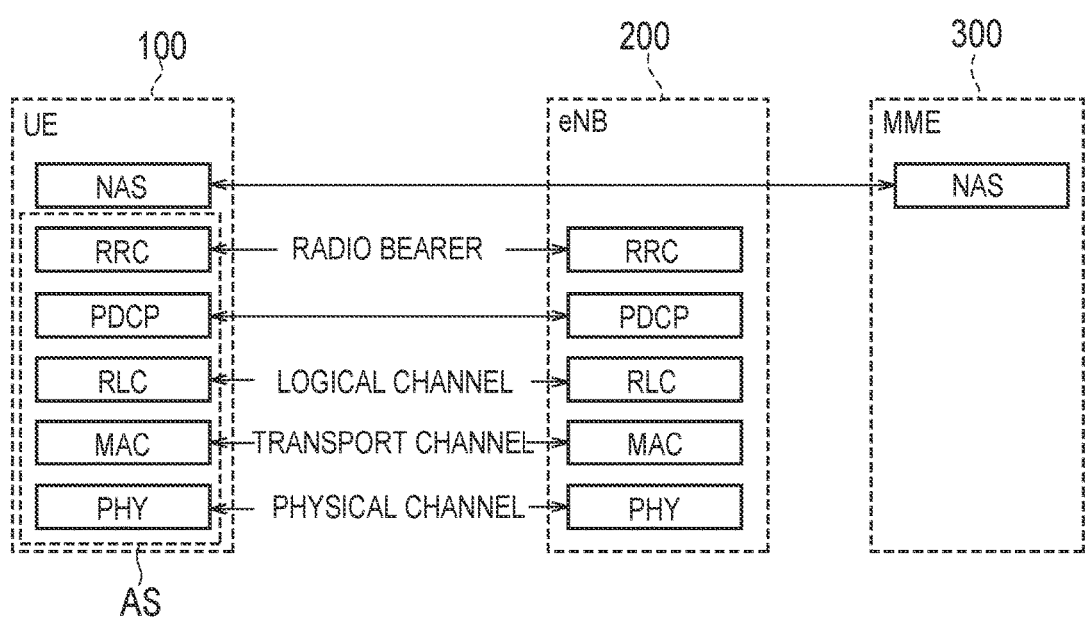
FIG. 2 is a protocol stack diagram of a radio interface in an LTE system.

FIG. 2 is a protocol stack diagram of a radio interface in an LTE system. As illustrated in FIG. 2, the radio interface protocol is divided into first to third layers of an OSI reference model, and the first layer is a physical (PHY) layer. The second layer includes a medium access control (MAC) layer, a radio link control (RLC) layer, and a packet data convergence protocol (PDCP) layer. The third layer includes a radio resource control (RRC) layer.

The PHY layer performs coding and decoding, modulation and demodulation, antenna mapping and demapping, and resource mapping and demapping. Data and control signals are transmitted between the PHY layer of the UE 100 and the PHY layer of the eNB 200 via a physical channel.

The MAC layer performs priority control of data, a retransmission process by hybrid ARQ (HARQ), a random access procedure, and the like. Data and control signals are transmitted between the MAC layer of the UE 100 and the MAC layer of the eNB 200 via a transport channel. The MAC layer of the eNB 200 includes a scheduler that determines uplink and downlink transport formats (transport block size, modulation and coding scheme (MCS)) and resource blocks allocated to the UE 100.

The RLC layer transmits data to the RLC layer on the receiving side by using the functions of the MAC layer and the PHY layer. Data and control signals are transmitted between the RLC layer of the UE 100 and the RLC layer of the eNB 200 via a logical channel.

The PDCP layer performs header compression and decompression, and encryption and decryption.

The RRC layer is defined only in a control plane that handles the control signals. A message (RRC message) for various configurations is transmitted between the RRC layer of the UE 100 and the RRC layer of the eNB 200. The RRC layer controls logical channels, transport channels, and physical channels in response to establishment, re-establishment, and release of radio bearers. If there is a connection (RRC connection) between the RRC of the UE 100 and the RRC of the eNB 200, the UE 100 is in an RRC connected mode (connected mode); otherwise, the UE 100 is in an RRC idle mode (idle mode). The RRC connected mode corresponds to a connected mode of the WWAN, and the RRC idle mode corresponds to an idle mode of the WWAN.

A non-access stratum (NAS) layer, which is located above the RRC layer, performs session management, mobility management, and the like.

The PHY layer, the MAC layer, the RLC layer, the PDCP layer, and the RRC layer constitute an access stratum (AS) layer. In the embodiment, the AS layer corresponds to a first entity that performs LTE communication (WWAN communication) with the eNB 200 (WWAN-supporting base station).

(Architecture of Radio Terminal)

Figure 3:
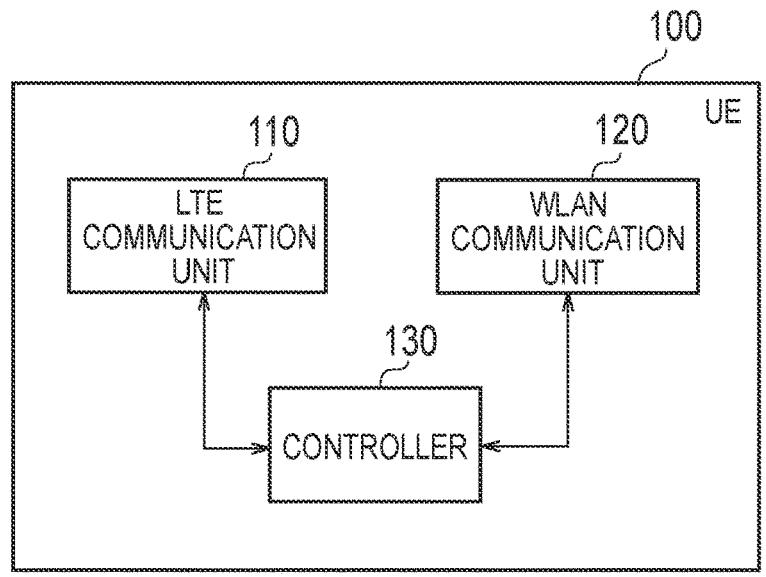
FIG. 3 is a block diagram of a UE (radio terminal).

FIG. 3 is a block diagram of the UE 100 (radio terminal). As illustrated in FIG. 3, the UE 100 includes an LTE communication unit (WWAN communication unit) 110, a WLAN communication unit 120, and a controller 130.

The LTE communication unit 110 performs LTE communication under the control of the controller 130. The LTE communication unit 110 may execute a part of an LTE protocol. The LTE communication unit 110 includes an antenna, a transmitter, and a receiver. The transmitter converts a baseband signal (transmission signal) output by the controller 130 into an LTE radio signal and transmits the LTE radio signal from the antenna. The receiver converts an LTE radio signal received by the antenna into a baseband signal (reception signal) and outputs the baseband signal to the controller 130. It is noted that the LTE communication is generally performed in a licensed band.

The WLAN communication unit 120 performs WLAN communication under the control of the controller 130. The WLAN communication unit 120 may execute a part of a WLAN protocol. The WLAN communication unit 120 includes an antenna, a transmitter, and a receiver. The transmitter converts a baseband signal (transmission signal) output by the controller 130 into a WLAN radio signal and transmits the WLAN radio signal from the antenna. The receiver converts a WLAN radio signal received by the antenna into a baseband signal (reception signal) and outputs the baseband signal to the controller 130. It is noted that the WLAN communication is generally performed in an unlicensed band.

The controller 130 performs various types of control on the UE 100. The controller 130 may execute a part of the LTE protocol, and may execute a part of the WLAN protocol. The controller 130 includes a processor and a memory. The memory stores a program executed by the processor, and information used for processing by the processor. The processor may include a baseband processor that performs modulation and demodulation, coding and decoding, and the like of the baseband signal, and a central processing unit (CPU) that performs a variety of processes by executing a program stored in the memory. The processor performs a variety of processes to be described later.

(Architecture of Base Station)

Figure 4:
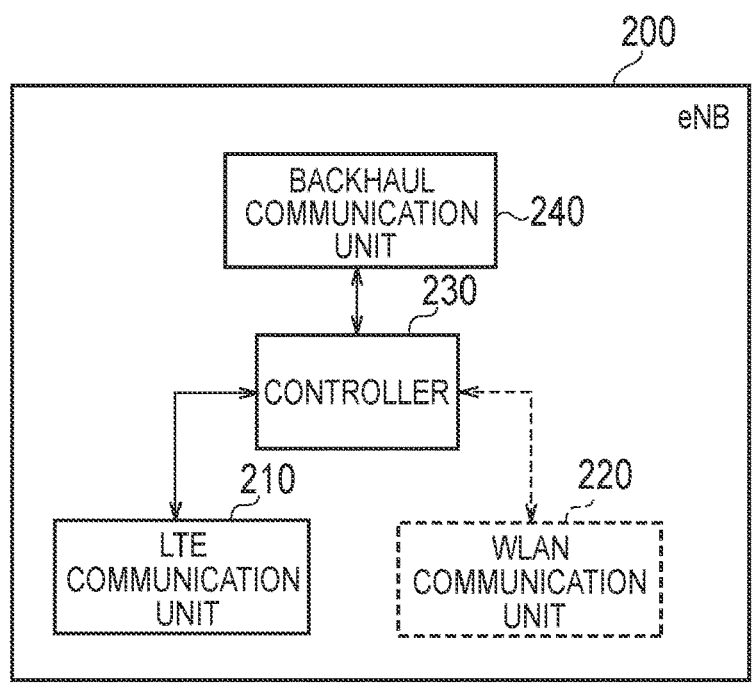
FIG. 4 is a block diagram of an eNB (WWAN-supporting base station).

FIG. 4 is a block diagram of the eNB 200 (base station). As illustrated in FIG. 4, the eNB 200 includes an LTE communication unit (WWAN communication unit) 210, a controller 230, and a backhaul communication unit 240. However, in the case of the collocated scenario, the eNB 200 may include a WLAN communication unit 220.

The LTE communication unit 210 performs LTE communication under the control of the controller 230. The LTE communication unit 210 may execute a part of an LTE protocol. The LTE communication unit 210 includes an antenna, a transmitter, and a receiver. The transmitter converts a baseband signal (transmission signal) output by the controller 230 into an LTE radio signal and transmits the LTE radio signal from the antenna. The receiver converts an LTE radio signal received by the antenna into a baseband signal (reception signal) and outputs the baseband signal to the controller 230.

The WLAN communication unit 220 performs WLAN communication under the control of the controller 230. The WLAN communication unit 220 may execute a part of a WLAN protocol. The WLAN communication unit 220 includes an antenna, a transmitter, and a receiver. The transmitter converts a baseband signal (transmission signal) output by the controller 230 into a WLAN radio signal and transmits the WLAN radio signal from the antenna. The receiver converts a WLAN radio signal received by the antenna into a baseband signal (reception signal) and outputs the baseband signal to the controller 230.

The controller 230 performs various types of control on the eNB 200. The controller 230 may execute a part of the LTE protocol, and may execute a part of the WLAN protocol. The controller 230 includes a processor and a memory. The memory stores a program executed by the processor, and information used for processing by the processor. The processor may include a baseband processor that performs modulation and demodulation, coding and decoding, and the like of the baseband signal, and a central processing unit (CPU) that performs a variety of processes by executing a program stored in the memory. The processor performs a variety of processes to be described later.

The backhaul communication unit 240 is connected to the neighbour eNB 200 via an X2 interface, connected to the EPC 500 (MME/S-GW) via an S1 interface, and connected to the WT 400 via an Xw interface. The backhaul communication unit 240 is used for communication performed on the X2 interface, communication performed on the S1 interface, communication performed on the Xw interface, and the like.

(Network Selection Operation)

The communication system according to the embodiment performs a network selection operation (access network selection) of selecting a communication target network from among the WWAN (E-UTRAN) and the WLAN with respect to data of the UE 100. The network selection operation includes a terminal-based scheme in which the UE 100 selects the communication target network and a base station-based scheme in which the eNB 200 selects the communication target network.

Since the terminal-based scheme is introduced in Release 12 of the 3GPP standard, the terminal-based scheme may be referred to as a Release 12 scheme. On the other hand, since the base station-based scheme is scheduled to be introduced in Release 13 of the 3GPP standard, the base station-based scheme may be referred to as a Release 13 scheme.

(1) Terminal-based Scheme

In the terminal-based scheme, the UE 100 in the RRC connected state or the RRC idle state selects a communication target network from among the E-UTRAN and the WLAN, and performs bidirectional switching (traffic steering) between the E-UTRAN and the WLAN. This switching is performed in a UE-based manner with the assistance of the E-UTRAN. In addition, the switching is performed in units of access point name (APN).

Figure 5:
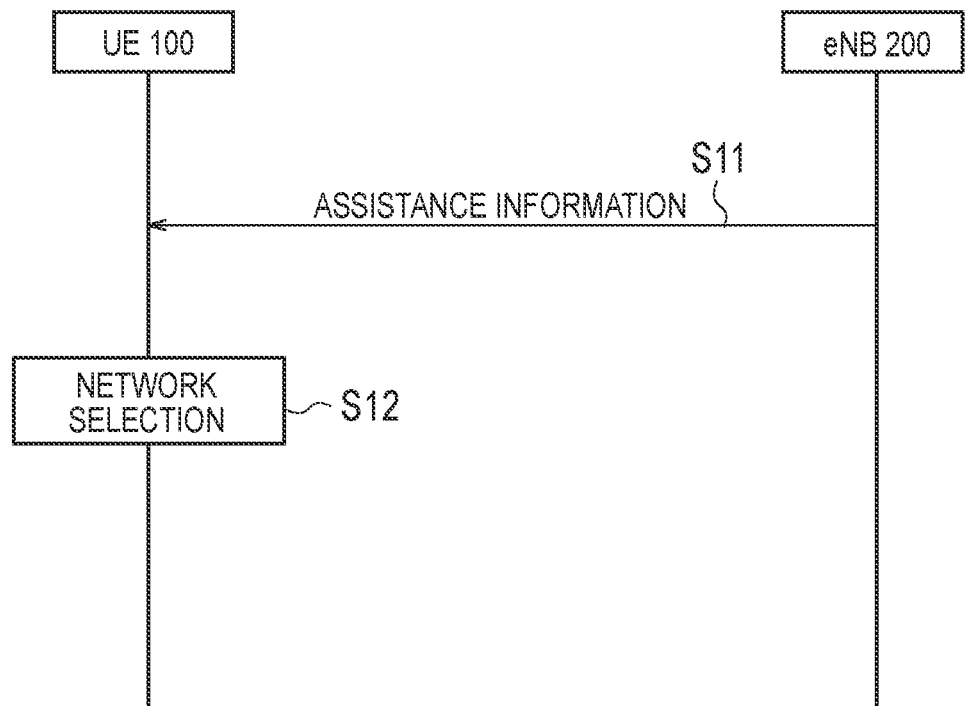
FIG. 5 is a diagram for describing a terminal-based scheme.

FIG. 5 is a diagram for describing the terminal-based scheme.

As illustrated in FIG. 5, in step S11, the eNB 200 transmits assistance information (RAN assistance parameters) to the UE 100 by broadcast RRC signaling or dedicated RRC signaling. The broadcast RRC signaling is, for example, a system information block (SIB) type 17. The dedicated RRC signaling is, for example, an "RRC connection reconfiguration" message.

The assistance information includes E-UTRAN signal strength (received power) thresholds and quality thresholds, WLAN channel utilization thresholds, WLAN backhaul data rate thresholds, WLAN signal strength (received power) thresholds and quality thresholds, and the like. The assistance information may include a WLAN identifier subject to the network selection operation. The WLAN identifier is a service set identifier (SSID), a homogeneous extended service set identifier (HESSID), a basic service set identifier (BSSID), or the like. The assistance information may include a parameter specifying a period over which the threshold (determination condition) should be satisfied. The UE 100 receives the assistance information and stores the received assistance information.

In step S12, the UE 100 performs a network selection operation.

First, the switching from the E-UTRAN to the WLAN will be described. Based on a first determination condition on the E-UTRAN and a second determination condition on the WLAN, the UE 100 performs switching determination as to whether to switch from the E-UTRAN to the WLAN. Specifically, if both the first determination condition and the second determination condition are satisfied, the UE 100 performs the switching from the E-UTRAN to the WLAN.

The first determination condition is the following condition for the E-UTRAN serving cell.

RSRPmeas<ThreshServingOffloadWLAN, LowP; or
RSRQmeas<ThreshServingOffloadWLAN, LowQ Here, "RSRPmeas" is received power of the LTE reference signal measured by the UE 100, that is, reference signal received power (RSRP). "RSRQmeas" is reception quality of the LTE reference signal measured by the UE 100, that is, reference signal received quality (RSRQ). "ThreshServingOffloadWLAN, LowP" and "ThreshServingOffloadWLAN, LowQ" are thresholds included in the assistance information.

The second determination condition is the following condition for a target WLAN.

ChannelUtilizationWLAN<ThreshChUtilWLAN, Low; and
BackhaulRateDlWLAN>ThreshBackhRateDLWLAN, High; and
BackhaulRateUlWLAN>ThreshBackhRateULWLAN, High; and
BeaconRSSI>ThreshBeaconRSSIWLAN, High;

Here, "ChannelUtilizationWLAN" is included in a WLAN beacon or probe response and indicates a WLAN channel utilization rate, that is, a WLAN radio load level. "BackhaulRateDlWLAN" and "BackhaulRateUlWLAN" are provided by an access network query protocol (ANQP) and indicate an available transmission rate of the WLAN backhaul, that is, a WLAN backhaul load level. "BeaconRSSI" indicates the WLAN signal strength measured by the UE 100. "ThreshChUtilWLAN, Low", "ThreshBackhRateDLWLAN, High", "ThreshBackhRateULWLAN, High", and "ThreshBeaconRSSIWLAN, High" are thresholds included in the assistance information.

Next, an example of switching from the WLAN to the E-UTRAN will be described. Based on a third determination condition on the WLAN and a fourth determination condition on the E-UTRAN, the UE 100 performs switching determination as to whether to switch from the WLAN to the E-UTRAN. Specifically, if one of the third determination condition and the fourth determination condition is satisfied, the UE 100 performs switching from the WLAN to the E-UTRAN.

The third determination condition is the following condition for a source WLAN.

ChannelUtilizationWLAN>ThreshChUtilWLAN, High; or

BackhaulRateDlWLAN<ThreshBackhRateDLWLAN, Low; or

BackhaulRateUlWLAN<ThreshBackhRateULWLAN, Low; or

BeaconRSSI<ThreshBeaconRSSIWLAN, Low;

Here, "ThreshChUtilWLAN, High", "ThreshBackhRateDLWLAN, Low", "ThreshBackhRateULWLAN, Low", and "ThreshBeaconRSSIWLAN, Low" are thresholds included in the assistance information.

The fourth determination condition is the following condition for an E-UTRAN target cell.

RSRPmeas>ThreshServingOffloadWLAN, HighP; and
RSRQmeas>ThreshServingOffloadWLAN, HighQ;

Here, "ThreshServingOffloadWLAN, HighP" and "ThreshServingOffloadWLAN, HighQ" are thresholds included in the assistance information.

If a switching condition from the E-UTRAN to the WLAN or a switching condition from the WLAN to the E-UTRAN is satisfied, the AS layer (first entity) of the UE 100 notifies an upper layer (second entity) that the switching condition is satisfied. Here, the upper layer is, for example, the NAS layer (or the application layer).

(2) Base Station-based Scheme

In the base station-based scheme, the eNB 200 selects a communication target network of the UE 100 from among the E-UTRAN and the WLAN based on a measurement report from the UE 100 and transmits, to the UE 100, a switching instruction for switching the communication target network.

A specific example of the base station-based scheme will be described below.

The eNB 200 transmits, to the UE 100, the WLAN measurement configuration for configuring the WLAN measurement report. For example, the eNB 200 includes a WLAN measurement configuration in an "RRC connection reconfiguration" message which is dedicated RRC signaling addressed to the UE 100. The UE 100 receives the WLAN measurement configuration from the eNB 200. The WLAN measurement configuration includes a predetermined identifier associated with the WLAN AP group to be measured. The predetermined identifier is associated with the identifier of each WLAN AP 300 in the WLAN AP group to be measured.

(2.1) Operation Pattern 1

In the operation pattern 1 of the base station-based scheme, the predetermined identifier is an identifier of a measurement object configuration for configuring an object to be measured. Such an identifier of the measurement object configuration is referred to as measurement object identifier (measObjectId).

Also, in the operation pattern 1 of the base station-based scheme, the WLAN measurement configuration includes an index of each WLAN AP 300 in the WLAN AP group to be measured. The index has a shorter bit length than the identifier of the WLAN AP 300. The identifier of the WLAN AP 300 (WLAN identifier) is, for example, SSID, HESSID, or BSSID.

A signaling overhead can be reduced by introducing a shorter index than the identifier of the WLAN AP 300, apart from the identifier of the WLAN AP 300, and transmitting and receiving the index. For example, when only part of the WLAN AP 300 is removed from the measurement object, the removal can be instructed by using the index.

(2.1.1) Operation Pattern 1A

In the operation pattern 1A of the base station-based scheme, the WLAN measurement configuration further includes an identifier of each WLAN AP 300 in the WLAN AP group to be measured.

Figure 6:
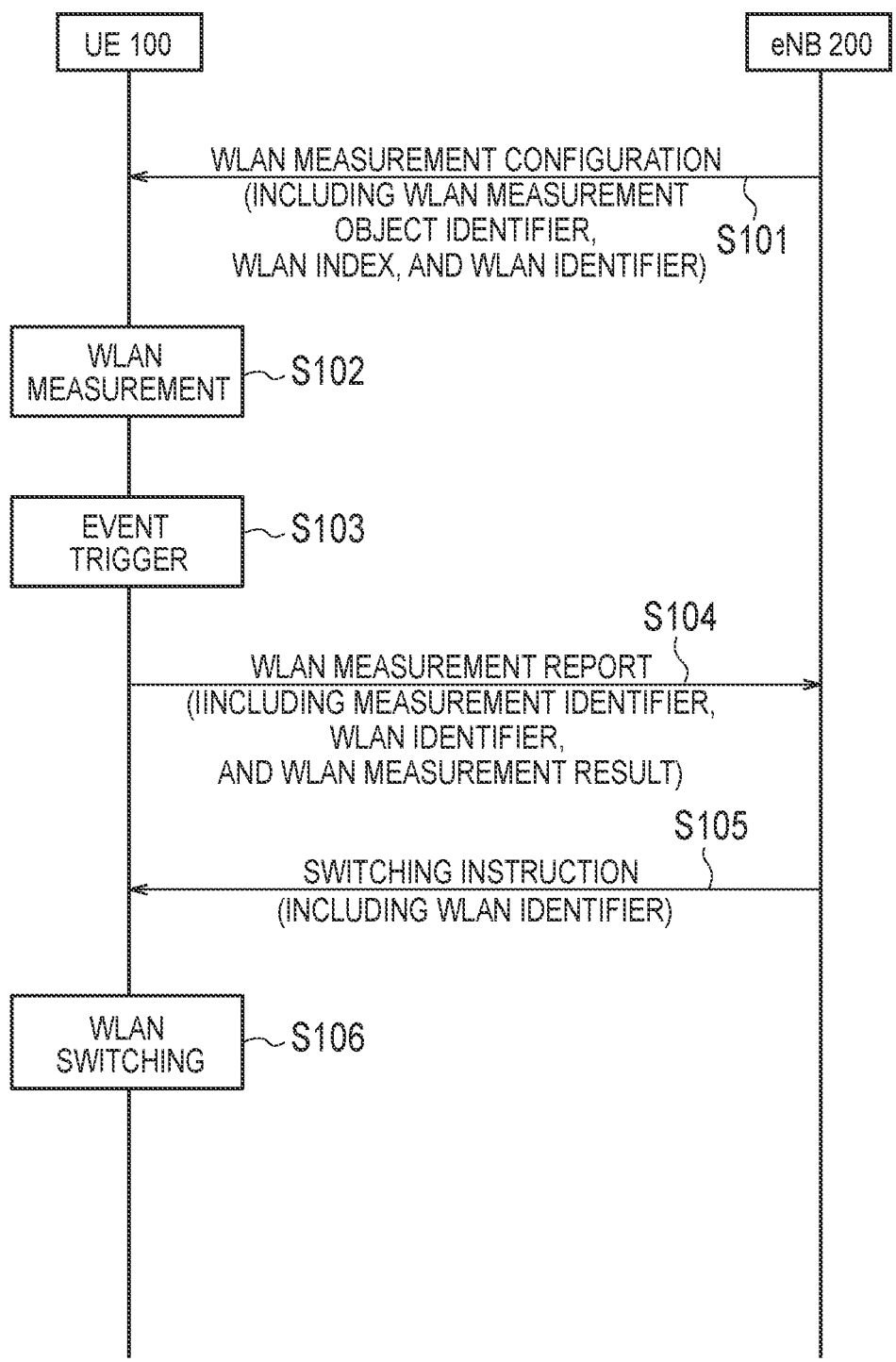
FIG. 6 is a sequence diagram illustrating an operation pattern 1A of a base station-based scheme according to an embodiment.
Figure 7:
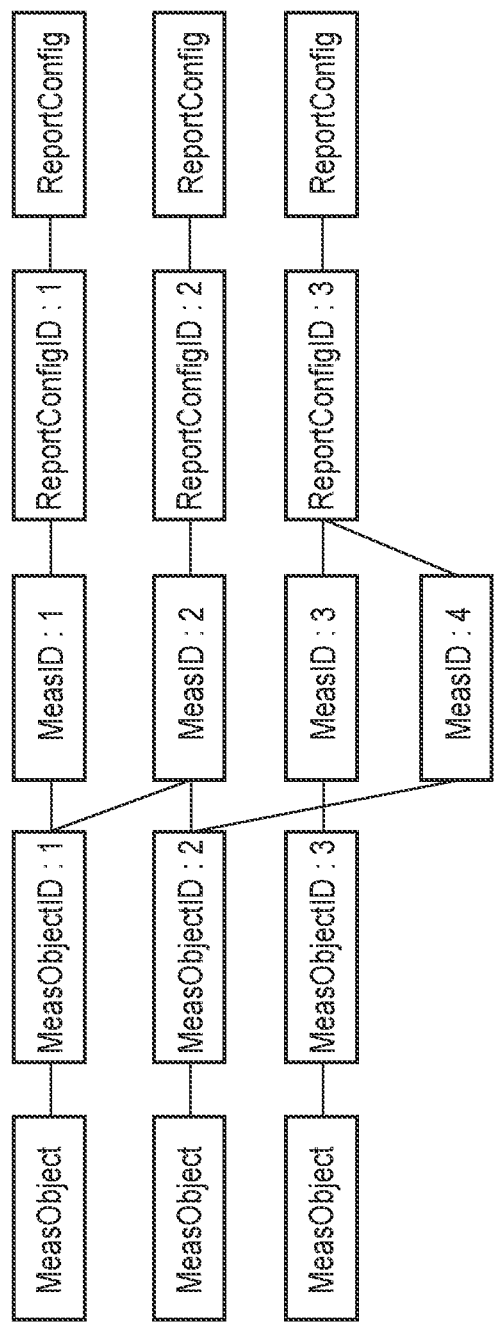
FIG. 7 is a diagram illustrating architecture of a WLAN measurement configuration according to an embodiment.

FIG. 6 is a sequence diagram illustrating the operation pattern 1A of the base station-based scheme. FIG. 7 is a diagram illustrating the architecture of the WLAN measurement configuration. FIG. 8 is a diagram illustrating a specific example of the WLAN measurement configuration in the operation pattern 1A of the base station-based scheme. It is noted that "Need ON" in FIG. 8 indicates that the parameter is optional, and if there is no value corresponding to the parameter, the UE 100 continues to use the currently configured value.

As illustrated in FIG. 6, in step S101, the eNB 200 transmits the WLAN measurement configuration to the UE 100. The UE 100 receives the WLAN measurement configuration.

As illustrated in FIG. 7, the WLAN measurement configuration (MeasConfig) includes a measurement object (MeasObject), a reporting configuration (ReportConfig), and a measurement identifier (MeasID). The measurement identifier (MeasID) associates the measurement object (MeasObject) with the reporting configuration (ReportConfig). Specifically, the measurement identifier (MeasID) indicates a combination of the identifier (MeasObjectID) of the measurement object (MeasObject) configuration and the identifier (ReportConfigID) of the reporting configuration (ReportConfig), and identifies a combination of the measurement object to be measured by the UE 100 and the reporting configuration.

As illustrated in FIG. 8, the measurement object (MeasObject) included in the WLAN measurement configuration (MeasConfig) includes a list of measurement objects to be removed (MeasObjectToRemoveList) and a list of measurement objects to be added or modified (MeasObjectToAddModList).

Each measurement object (MeasObjectToAddMod) included in the list of measurement objects to be added or modified (MeasObjectToAddModList) includes a measurement object identifier (measObjectId) and a measurement object (measObject). The measurement object (measObject) includes a measurement object WLAN (MeasObjectWLAN).

The measurement object WLAN (MeasObjectWLAN) includes a measurement object WLAN frequency (wlancarrierFreq), a list of WLAN APs to be removed from the measurement object (wlansToRemoveList), and a list of WLAN APs to be added to the measurement object or modified (wlansToAddModList). FIG. 8 illustrates an example in which the measurement object WLAN frequency (wlancarrierFreq) is 2.4 GHz or 5 GHz. The list of WLAN APs to be removed from the measurement object (wlansToRemoveList) includes a list of indices of the WLAN APs (wlanIndexList).

Each WLAN AP information (WlansToAddMod) included in the list of WLAN APs to be added to the measurement object or modified (wlansToAddModList) includes an index (wlanIndex) and an identifier (wlanIdentifiers-r13) of each WLAN AP.

The reporting configuration (ReportConfig) included in the WLAN measurement configuration (MeasConfig) includes a trigger type (TriggerType) of the WLAN measurement report and the like. In the embodiment, "event trigger reporting" that transmits the WLAN measurement report upon occurrence of an event is mainly assumed. Such an event includes an event that the quality of the WLAN becomes higher than the threshold and an event that the quality of the WLAN becomes lower than the threshold. Alternatively, there may be an event that the quality of the LTE becomes lower than the threshold 1 and the quality of the WLAN becomes higher than the threshold 2. The event may be an event that the quality of the LTE becomes higher than the threshold 1 and the quality of the WLAN becomes lower than the threshold 2. The event may be an event that the quality of the current WLAN becomes lower than the threshold 1 and the quality of another WLAN becomes higher than the threshold 2.

In the situation illustrated in FIG. 1, it is assumed that the eNB 200 wants to grasp that the UE 100 moves to the coverage of the WLAN AP group B. In this case, the eNB 200 includes the measurement object identifier (measObjectId) and the measurement object (measObject) corresponding to the WLAN AP group B in the list of measurement objects to be added or modified (MeasObjectToAddModList). In addition, the eNB 200 combines the reporting configuration (ReportConfig) including the event that the quality of the WLAN becomes higher than the threshold with the measurement object identifier (measObjectId) corresponding to the WLAN AP group B. Therefore, if the quality of the WLAN AP 300 included in the WLAN AP group B becomes higher than the threshold, the UE 100 transmits, to the eNB 200, the WLAN measurement report related to the WLAN AP 300.

As illustrated in FIG. 6, in step S102, the UE 100 performs measurement indicated by the measurement identifier (MeasID) based on the WLAN measurement configuration (MeasConfig). Specifically, the UE 100 performs WLAN measurement on the measurement object WLAN (MeasObjectWLAN) corresponding to the measurement identifier (MeasID). Examples of the measurement parameter for the WLAN measurement include "ChannelUtilizationWLAN", "BackhaulRateDlWLAN", "BackhaulRateUlWLAN", and "BeaconRSSI". "ChannelUtilizationWLAN" is included in the WLAN beacon or probe response and indicates the WLAN channel utilization, that is, the WLAN radio load level. "BackhaulRateDlWLAN" and "BackhaulRateUlWLAN" are provided by the access network query protocol (ANQP) and indicate the available transmission rate of the WLAN backhaul, that is, the WLAN backhaul load level. "BeaconRSSI" indicates the WLAN signal strength measured by the UE 100. The type of the measurement parameter in the WLAN measurement may be specified by the reporting configuration (ReportConfig).

In step S103, the UE 100 determines that the event specified by the reporting configuration (ReportConfig) has occurred, based on the WLAN measurement.

In step S104, the UE 100 transmits the WLAN measurement report to the eNB 200. The eNB 200 receives the WLAN measurement report. The WLAN measurement report includes the measurement identifier (MeasID), the WLAN AP identifier (WLAN identifier), the WLAN measurement result, and the like. Since the measurement identifier (MeasID) is associated with the measurement object identifier (measObjectId), the eNB 200 can identify the WLAN AP group based on the measurement identifier (MeasID). Alternatively, the WLAN measurement report may include the measurement object identifier (measObjectId). Alternatively, in order to reduce the signaling overhead, the WLAN measurement report may include the index of the WLAN AP (WLAN index) instead of the WLAN AP identifier (WLAN identifier).

Based on the WLAN measurement report, the eNB 200 grasps that the UE 100 has moved to the coverage of the WLAN AP group to be measured. In addition, the eNB 200 determines the WLAN AP 300 to perform WLAN communication with the UE 100 among the WLAN APs 300 included in the WLAN AP group to be measured.

In step S105, the eNB 200 transmits, to the UE 100, the switching instruction including the identifier of the determined WLAN AP 300 (WLAN identifier). Here, instead of the identifier of the WLAN AP (WLAN identifier), the index of the WLAN AP (WLAN index) may be used. The UE 100 receives the switching instruction. Such a switching instruction may be referred to as "steering command". In the embodiment, it is assumed that the switching instruction is an instruction for switching the WLAN communication from one WLAN AP 300 to another WLAN AP 300. Specifically, the switching instruction may be an instruction for switching the WLAN communication from the WLAN AP 300 belonging to one WLAN AP group to the WLAN AP 300 belonging to another WLAN AP group. However, the switching instruction may be an instruction for switching the communication (data) from the eNB 200 to the WLAN AP 300. Alternatively, the switching instruction may be an instruction for starting "WLAN aggregation" in which the UE 100 performs communication with the eNB 200 and communication with the AP 300 at the same time. The "WLAN aggregation" start instruction may be transmitted from the eNB 200 to the UE 100 via the "RRC connection reconfiguration" message.

In step S106, the UE 100 performs switching to the WLAN AP 300 specified by the switching instruction. The UE 100 may transmit, to the eNB 200, an acknowledge reply or a negative reply to the switching instruction.

(2.1.2) Operation Pattern 1B

In the operation pattern 1B of the base station-based scheme, the eNB 200 transmits, to the UE 100, notification information different from the WLAN measurement configuration in a broadcast or unicast manner. The notification information includes an index and an identifier of each of the plurality of WLAN APs 300. The UE 100 receives the notification information. Alternatively, the UE 100 may receive the notification information from the EPC 500 (core network) via the eNB 200. For example, the UE 100 receives the notification information from an access network discovery and selection function (ANDSF) provided in the EPC 500.

As such, the UE 100 is notified of the correspondence relation between the index and the identifier of each of the WLAN APs 300 separately from the WLAN measurement configuration. Therefore, it is not necessary to include the identifier of the WLAN AP 300 in the WLAN measurement configuration, and the index of the WLAN AP 300 only needs to be included in the WLAN measurement configuration. Thus, the size of the WLAN measurement configuration (specifically, MeasObjectWLAN) can be reduced. In particular, if the WLAN measurement configuration (specifically, MeasObjectWLAN) is frequently updated, the effect of reducing the signaling overhead is great.

FIG. 9 is a sequence diagram illustrating the operation pattern 1B of the base station-based scheme. Here, differences from the operation pattern 1A of the base station-based scheme will be mainly described.

As illustrated in FIG. 9, in step S131, the eNB 200 transmits, to the UE 100, notification information including the index and the identifier of each of the plurality of WLAN APs 300 existing in the eNB's own coverage in a broadcast or unicast manner. The UE 100 receives the notification information and stores the received notification information.

In the case of the broadcast transmission, the eNB 200 includes the notification information in, for example, the system information block (SIB). If the WLAN AP group is shared rather than dedicated to the UE, that is, if the grouping of the WLAN AP is common to all UEs 100 within the cell, provision using the SIB results in resource reduction. On the other hand, in the case of the unicast transmission, the eNB 200 includes the notification information in the "RRC connection reconfiguration" message which is the dedicated RRC signaling addressed to the UE 100.

In step S132, the eNB 200 transmits the WLAN measurement configuration to the UE 100. The UE 100 receives the WLAN measurement configuration. In the operation pattern 1B of the base station-based scheme, the WLAN measurement configuration (specifically, MeasObjectWLAN) includes the index of the WLAN AP 300, but does not include the identifier of the WLAN AP 300. The other points are similar to the WLAN measurement configuration in the operation pattern 1A. Based on the stored notification information, the UE 100 derives a WLAN identifier corresponding to the index of the WLAN AP 300 included in the WLAN measurement configuration.

The subsequent operations (steps S133 to S137) are similar to those of the operation pattern 1A of the base station-based scheme.

(2.2) Operation Pattern 2

In the operation pattern 2 of the base station-based scheme, a predetermined identifier associated with the WLAN AP group to be measured is a group identifier of the WLAN AP group to be measured.

(2.2.1) Operation Pattern 2A

In the operation pattern 2A of the base station-based scheme, the WLAN measurement configuration includes the identifier of each WLAN AP 300 in the WLAN AP group to be measured.

FIG. 10 is a sequence diagram illustrating the operation pattern 2A of the base station-based scheme. Here, differences from the operation pattern 1A of the base station-based scheme will be mainly described.

As illustrated in FIG. 10, in step S151, the eNB 200 transmits the WLAN measurement configuration to the UE 100. The UE 100 receives the WLAN measurement configuration.

In the operation pattern 2A of the base station-based scheme, the measurement object (MeasObject) included in the WLAN measurement configuration (MeasConfig) includes a list of measurement objects to be removed (MeasObjectToRemoveList) and a list of measurement objects to be added or modified (MeasObjectToAddModList).

Each measurement object (MeasObjectToAddMod) included in the list of measurement objects to be added or modified (MeasObjectToAddModList) includes a measurement object identifier (measObjectId) and a measurement object (measObject). The measurement object (measObject) includes a measurement object WLAN (MeasObjectWLAN). The measurement object WLAN (MeasObjectWLAN) includes a group identifier.

The measurement object WLAN (MeasObjectWLAN) includes a measurement object WLAN frequency (wlancarrierFreq), a list of WLAN APs to be removed from the measurement object (wlansToRemoveList), and a list of WLAN APs to be added to the measurement object or modified (wlansToAddModList). The list of WLAN APs to be removed from the measurement object (wlansToRemoveList) includes a list of identifiers of the WLAN APs (WLAN identifiers). Each WLAN AP information (WlansToAddMod) included in wlansToAddModList includes the identifier of each WLAN AP (wlan-Identifiers-r13).

In step S152, the UE 100 performs measurement indicated by the measurement identifier (MeasID) based on the WLAN measurement configuration (MeasConfig). Specifically, the UE 100 performs WLAN measurement on the measurement object WLAN (MeasObjectWLAN) corresponding to the measurement identifier (MeasID).

In step S153, the UE 100 determines that the event specified by the reporting configuration (ReportConfig) has occurred, based on the WLAN measurement.

In step S154, the UE 100 transmits the WLAN measurement report to the eNB 200. The eNB 200 receives the WLAN measurement report. The WLAN measurement report includes the group identifier, the WLAN AP identifier (WLAN identifier), the WLAN measurement result, and the like. The eNB 200 can identify the WLAN AP group based on the group identifier. It is noted that the WLAN measurement report includes the WLAN AP identifier (WLAN identifier), but may not include the group identifier. This is because, if the eNB 200 can uniquely specify the WLAN AP group by receiving the WLAN identifier, there is a possibility that the group identifier will not be needed. Alternatively, the WLAN measurement report includes the group identifier, but may not include the WLAN identifier. This is because, if the UE 100 is initially connected to the WLAN, there is a possibility that the UE 100 will not need the WLAN identifier.

Based on the WLAN measurement report, the eNB 200 grasps that the UE 100 has moved to the coverage of the WLAN AP group to be measured. In addition, the eNB 200 determines the WLAN AP 300 to perform WLAN communication with the UE 100 among the WLAN APs 300 included in the WLAN AP group to be measured.

In step S155, the eNB 200 transmits, to the UE 100, a switching instruction including the identifier of the determined WLAN AP 300 (WLAN identifier). The UE 100 receives the switching instruction. Alternatively, in order to reduce the signaling overhead, the switching instruction may include the group identifier instead of the identifier of the WLAN AP (WLAN identifier). In addition, in the case of assuming a special case where, for example, one WLAN AP belongs to two or more groups, there is a risk that the UE 100 will freely communicate with a plurality of groups one after another via the one WLAN AP. In the switching instruction, it is expected to obtain the effect that prevents such an operation by explicitly specifying the "group" to which traffic is to be transferred.

In step S156, the UE 100 performs switching to the WLAN AP 300 specified by the switching instruction (or the specified WLAN AP group). Alternatively, the switching instruction may be an instruction for starting "WLAN aggregation" in which the UE 100 performs communication with the eNB 200 and communication with the AP 300 at the same time. The UE 100 may transmit, to the eNB 200, an acknowledge reply or a negative reply to the switching instruction.

(2.2.2) Operation Pattern 2B

In the operation pattern 2B of the base station-based scheme, the eNB 200 transmits, to the UE 100, notification information different from the WLAN measurement configuration in a broadcast or unicast manner. The notification information includes the group identifier of the WLAN AP group and the identifier of each WLAN AP 300 in the WLAN AP group. The UE 100 receives the notification information. Alternatively, the UE 100 may receive the notification information from the EPC 500 (core network) via the eNB 200. For example, the UE 100 receives the notification information from an ANDSF provided in the EPC 500.

In this manner, the UE 100 is notified of, separately from the WLAN measurement configuration, the correspondence relation between the group identifier of the WLAN AP group and the identifier of each WLAN AP 300 in the WLAN AP group. Therefore, it is not necessary to include the identifier of the WLAN AP 300 in the WLAN measurement configuration, and the group identifier of the WLAN AP group to be measured only needs to be included in the WLAN measurement configuration. Thus, the size of the WLAN measurement configuration (specifically, MeasObjectWLAN) can be reduced. In particular, if the WLAN measurement configuration (specifically, MeasObjectWLAN) is frequently updated, the effect of reducing the signaling overhead is great.

FIG. 11 is a sequence diagram illustrating the operation pattern 2B of the base station-based scheme. Here, differences from the operation pattern 2A of the base station-based scheme will be mainly described.

As illustrated in FIG. 11, in step S171, the eNB 200 transmits, to the UE 100, notification information including the group identifier of the WLAN AP group existing in the eNB's own coverage and the identifier of each WLAN AP 300 in the WLAN AP group in a broadcast or unicast manner. The UE 100 receives the notification information and stores the received notification information.

In the case of the broadcast transmission, the eNB 200 includes the notification information in, for example, the system information block (SIB). On the other hand, in the case of the unicast transmission, the eNB 200 includes the notification information in the "RRC connection reconfiguration" message which is the dedicated RRC signaling addressed to the UE 100.

In step S172, the eNB 200 transmits the WLAN measurement configuration to the UE 100. The UE 100 receives the WLAN measurement configuration. In the operation pattern 2B of the base station-based scheme, the WLAN measurement configuration (specifically, MeasObjectWLAN) includes the group identifier of the WLAN AP group to be measured, but does not include the identifier of the WLAN AP 300. The other points are similar to the WLAN measurement configuration in the operation pattern 2A. Based on the stored notification information, the UE 100 derives each WLAN identifier corresponding to the group identifier included in the WLAN measurement configuration.

The subsequent operations (steps S173 to S177) are similar to those of the operation pattern 2A of the base station-based scheme.

(2.3) Operation of UE 100 Having Received Switching Instruction The operation of the UE 100 having received the switching instruction from the eNB 200 will be described below. FIG. 12 is a sequence diagram illustrating the operation of the UE 100 having received the switching instruction.

As illustrated in FIG. 12, the UE 100 includes a first entity 131 that performs WWAN communication with the eNB 200, and a second entity 132 that is located at a higher layer than the first entity 131. The first entity 131 and the second entity 132 are included in the controller 130 of the UE 100. The first entity 131 is an AS layer entity. The first entity 131 may be an RRC layer entity in the AS layer entity. The second entity 132 is a NAS layer entity. The second entity 132 may be an application layer entity.

In step S191, the first entity 131 receives, from the eNB 200, the switching instruction for switching the communication target network between the WWAN (E-UTRAN) and the WLAN with respect to the data of the UE 100. The switching instruction is transmitted from the eNB 200 by the dedicated RRC signaling (for example, "RRC connection reconfiguration" message) addressed to the UE 100. Here, the instruction for switching from the E-UTRAN to the WLAN is assumed. The switching instruction includes an identifier related to a WLAN to be connected. The identifier related to a WLAN to be connected is at least one of the identifier of the WLAN AP 300 (WLAN identifier), the index of the WLAN AP 300 (WLAN index), and the identifier of the WLAN AP group (group identifier).

In step S192, the first entity 131 notifies the second entity 132 of an indicator (move-traffic-to-WLAN) indicating the switching of the communication target network in response to reception of the switching instruction from the eNB 200.

In the communication system according to the embodiment, the terminal-based scheme in which the first entity 131 performs the network selection to select the communication target network from among the WWAN and the WLAN and the base station-based scheme in which the eNB 200 performs the network selection are defined. If the switching instruction is received from the eNB 200, the first entity 131 notifies the second entity 132 of an indicator capable of identifying that the base station-based scheme is applied.

Here, the indicator capable of identifying that the base station-based scheme is applied is an indicator dedicated to the base station-based scheme. For example, the indicator is move-traffic-to-WLAN-r13.

Alternatively, the indicator capable of identifying that the base station-based scheme is applied is an indicator in which information indicating the base station-based scheme is added to the indicator in the terminal-based scheme. For example, the first entity 131 adds a "preference indicator" to move-traffic-to-WLAN (indicator in the terminal-based scheme) of Release 12. The "preference indicator" is, for example, a special offload preference indicator (OPI).

In this manner, by notifying the second entity 132 of the indicator capable of identifying that the base station-based scheme is applied, the second entity 132 can appropriately determine whether to switch the communication target network. Specifically, if the switching of the communication target network is instructed by the base station-based scheme, it can be determined that the necessity to switch the communication target network is high, and the process of switching the communication target network can be performed.

In addition, if the switching instruction instructs the switching from the WWAN to the WLAN, the switching instruction includes the identifier related to the WLAN to be connected. When the second entity 132 is notified of the indicator, the first entity 131 notifies the second entity 132 of the identifier related to the WLAN to be connected, which is included in the switching instruction.

In response to the reception of the indicator from the first entity 131, the second entity 132 determines whether to switch the communication target network from the WWAN to the WLAN. If the second entity 132 determines that the communication target network is switched from the WWAN to the WLAN, the second entity 132 performs a process of switching the communication target network from the WWAN to the WLAN by connecting to the WLAN to be connected based on the identifier related to the WLAN to be connected.

In step S193, the second entity 132 notifies the first entity 131 of the response.

In step S194, the first entity 131 notifies the eNB 200 of the response based on the response from the second entity 132.

For example, if the connection to the WLAN is notified from the second entity 132, the first entity 131 transmits, to the eNB 200, a report (WLAN connection complete report) indicating the connection to the WLAN.

Alternatively, if non-compliance with the switching instruction and the reason therefor are notified from the second entity 132, the first entity 131 transmits, to the eNB 200, information (cause value) indicating the reason for not following the switching instruction. Examples of the "cause value" include "notOffloadablePDN", "upplerLayerDecision", and "ANDSFConfliction". Here, "notOffloadablePDN" is used if the switching is not possible because of a packet data network (PDN) connection in which offload is not permitted. "upplerLayerDecision" is used if the switching is not possible due to an arbitrary decision of the second entity 132. "ANDSFConfliction" is used if the determination of the ANDSF does not match the contents of the switching instruction.

Alternatively, if the connection to the WLAN different from the connection target WLAN specified by the switching instruction and the identifier related to the connected WLAN are notified from the second entity 132, the first entity 131 may transmit, to the eNB 200, the identifier related to the connected WLAN. The identifier related to the connected WLAN is at least one of the WLAN identifier, the WLAN index, and the group identifier.

(Use of Terminal-based Scheme and Base Station-based Scheme in Combination)

The case of using the terminal-based scheme and the base station-based scheme in combination will be described below.

Figure 13:
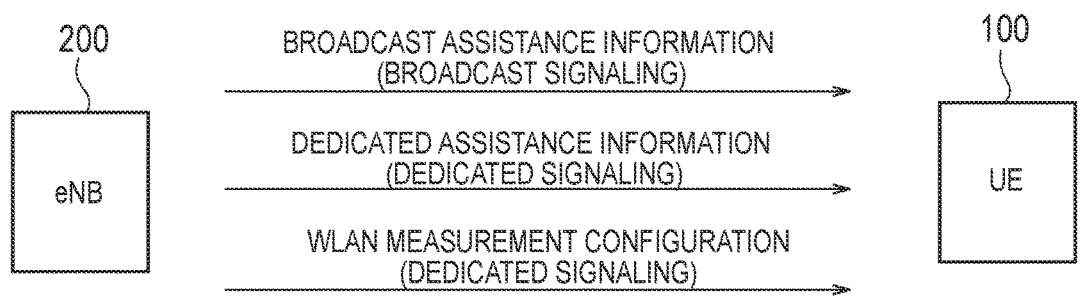
FIG. 13 is a diagram for describing an operation of using the terminal-based scheme and the base station-based scheme in combination according to an embodiment.

FIG. 13 is a diagram for describing an operation of using the terminal-based scheme and the base station-based scheme in combination.

As described above, in the terminal-based scheme, the eNB 200 transmits the assistance information (RAN assistance parameters) to the UE 100 by broadcast signaling (broadcast RRC signaling) or dedicated signaling (dedicated RRC signaling). Hereinafter, the assistance information transmitted by the broadcast signaling is referred to as "broadcast assistance information". The assistance information transmitted by the dedicated signaling is referred to as "dedicated assistance information".

In contrast, in the base station-based scheme, the eNB 200 transmits the WLAN measurement configuration to the UE 100 by dedicated signaling (dedicated RRC signaling).

Therefore, as the signaling performed from the eNB 200 to the UE 100 for the network selection, there are three types of signaling, i.e., broadcast assistance information, dedicated assistance information, and WLAN measurement configuration. However, it is not clear how to use these three types of signaling.

Operation patterns 1 to 3 in the case of using the terminal-based scheme and the base station-based scheme in combination will be described below. The operation patterns 1 to 3 are common in that the eNB 200 transmits broadcast assistance information. The UE 100 in the RRC idle mode performs the network selection of the terminal-based scheme based on the broadcast assistance information.

(1) Operation Pattern 1

In the operation pattern 1, the eNB 200 transmits the broadcast assistance information. The UE 100 in the RRC idle mode and the UE 100 in the RRC connected mode receive the broadcast assistance information and perform the network selection of the terminal-based scheme based on the broadcast assistance information.

In the operation pattern 1, the UE 100 in the RRC connected mode may transmit, to the eNB 200, request information requesting the transmission of the dedicated assistance information or the transmission of the WLAN measurement configuration. The UE 100 may transmit the request information to the eNB 200 by using, as a trigger, any one of the fact that the eNB 200 instructs the transmission of the request information, the fact that the WLAN communication unit 120 is turned on, or the fact that there is the instruction (user's selection) from the application layer. The request information includes information specifying at least one of the terminal-based scheme and the base station-based scheme. In response to receiving, from the UE 100, the request information requesting the transmission of the WLAN measurement configuration, the eNB 200 transmits the WLAN measurement configuration by dedicated signaling. In addition, in response to receiving, from the UE 100, the request information requesting the transmission of the dedicated assistance information, the eNB 200 transmits the dedicated assistance information by dedicated signaling.

(2) Operation Pattern 2

In the operation pattern 2, the eNB 200 transmits the broadcast assistance information and transmits the WLAN measurement configuration to the UE 100 being in the RRC connected mode by dedicated signaling. However, in the operation pattern 2, the eNB 200 does not transmit the dedicated assistance information.

In the operation pattern 2, the UE 100 in the RRC idle mode receives the broadcast assistance information and performs the network selection of the terminal-based scheme based on the broadcast assistance information. In addition, the UE 100 in the RRC connected mode receives the WLAN measurement configuration.

In the operation pattern 2, the UE 100 in the RRC connected mode performs the network selection of the terminal-based scheme based on the broadcast assistance information in a predetermined WLAN AP group. In addition, if the UE 100 in the RRC connected mode discovers a WLAN AP group different from the predetermined WLAN AP group, the UE 100 performs the WLAN measurement of the base station-based scheme based on the WLAN measurement configuration. The UE 100 may switch from the terminal-based scheme to the base station-based scheme in response to the discovery of the WLAN AP 300 of the different WLAN AP group, and transmit the WLAN measurement report to the eNB 200. Therefore, the base station-based scheme can be applied when switching to the WLAN AP 300 of the WLAN AP group different from the current WLAN AP group.

Alternatively, in the operation pattern 2, if the UE 100 in the RRC connected mode receives the WLAN measurement configuration, the UE 100 does not apply the network selection of the terminal-based scheme based on the broadcast assistance information, and performs the WLAN measurement of the base station-based scheme based on the WLAN measurement configuration. In response to the reception of the WLAN measurement configuration, the UE 100 may stop the network selection of the terminal-based scheme. In this manner, the UE 100 preferentially applies the base station-based scheme over the terminal-based scheme, thereby avoiding the conflict between the network selection of the terminal-based scheme and the network selection of the base station-based scheme.

Alternatively, the UE 100 in the RRC connected mode performs control not to apply the network selection of the terminal-based scheme based on the broadcast assistance information with respect to the WLAN identifier that overlaps the WLAN measurement configuration among the WLAN identifiers included in the broadcast assistance information. This makes it possible to avoid the conflict between the network selection of the terminal-based scheme and the network selection of the base station-based scheme. The WLAN identifier that overlaps the WLAN measurement configuration is the WLAN identifier configured according to the WLAN measurement configuration. The WLAN identifier that overlaps the WLAN measurement configuration may be the WLAN identifier corresponding to the WLAN index configured according to the WLAN measurement configuration or the WLAN identifier included in the WLAN AP group configured according to the WLAN measurement configuration. In addition, the UE 100 in the RRC connected mode may apply the network selection of the terminal-based scheme based on the broadcast assistance information with respect to the WLAN identifier that does not overlap the WLAN measurement configuration among the WLAN identifiers included in the broadcast assistance information.

Alternatively, the UE 100 performs the network selection of the terminal-based scheme based on the broadcast assistance information until an instruction for moving to a WLAN group different from a predetermined WLAN AP group (or a WLAN AP of a different WLAN group) is received from the eNB 200. In this case, the UE 100 may apply both the terminal-based scheme and the base station-based scheme until the instruction for moving to the different WLAN group is received after the discovery of the different WLAN group. It is noted that the UE 100 may switch from the base station-based scheme to the terminal-based scheme after the instruction for moving to the different WLAN group (or the WLAN AP of the different WLAN group) is received from the eNB 200. In this case, the UE 100 may perform the network selection of the terminal-based scheme based on the already held broadcast assistance information.

(3) Operation Pattern 3

In the operation pattern 3, the eNB 200 transmits the broadcast assistance information and transmits the dedicated assistance information and the WLAN measurement configuration to the UE 100 being in the RRC connected mode by dedicated signaling.

In the operation pattern 3, the UE 100 in the RRC idle mode receives the broadcast assistance information and performs the network selection of the terminal-based scheme based on the broadcast assistance information. In addition, the UE 100 in the RRC connected mode receives the dedicated assistance information and the WLAN measurement configuration.

In the operation pattern 3, the UE 100 in the RRC connected mode performs the network selection of the terminal-based scheme based on the dedicated assistance information in the same WLAN AP group. In addition, if the UE 100 in the RRC connected mode discovers a different WLAN AP group, the UE 100 performs the WLAN measurement of the base station-based scheme based on the WLAN measurement configuration. The UE 100 may switch to the base station-based scheme in response to the discovery of the WLAN AP 300 of the different WLAN AP group, and transmit the WLAN measurement report to the eNB 200. Therefore, the base station-based scheme can be applied when switching to the WLAN AP 300 of the WLAN AP group different from the current WLAN AP group.

In addition, as described in the operation pattern 2, the UE 100 in the RRC connected mode may perform control not to apply the network selection of the terminal-based scheme based on the broadcast assistance information with respect to the WLAN identifier that overlaps the WLAN measurement configuration among the WLAN identifiers included in the broadcast assistance information. However, if the UE 100 switches from the WLAN to the WWAN, the UE 100 may apply the network selection of the terminal-based scheme.

Alternatively, in the operation pattern 3, after a condition for reporting the result of the WLAN measurement based on the WLAN measurement configuration to the eNB 200 is satisfied, the UE 100 in the RRC connected mode performs control not to apply the network selection of the terminal-based scheme based on the broadcast assistance information or the dedicated assistance information. Specifically, the UE 100 stops the network selection of the terminal-based scheme at a timing when a trigger event of the WLAN measurement report is satisfied, a timing when the WLAN measurement report is transmitted, or a timing when an instruction for switching to the WLAN is received. This makes it possible to avoid the occurrence of a ping-pong phenomenon caused by switching to the LTE by the terminal-based scheme immediately after performing the switching to the WLAN by the base station-based scheme.

Other Embodiments

The UE 100, which has selected the WLAN by the switching instruction from the eNB 200 (step S105 of FIG. 6, step S136 of FIG. 9, step S155 of FIG. 10, and step S176 of FIG. 11), may transition from the RRC connected mode to the RRC idle mode. In the RRC connected mode, the UE 100 receives, from the eNB 200, the WLAN measurement configuration for configuring the WLAN measurement report. If the UE 100 transitions from the RRC connected mode to the RRC idle mode, the UE 100 may hold the WLAN measurement configuration in the RRC idle mode. Specifically, if the UE 100 performs switching to the WLAN AP 300 in response to a switching instruction from the eNB 200, the UE 100 transitions from the RRC connected mode to the RRC idle mode and holds the WLAN measurement configuration in the RRC idle mode. This allows the UE 100 to continue the WLAN measurement in the RRC idle mode. For example, when the UE 100, which has transitioned to the RRC idle mode after transferring data to the WLAN AP of the WLAN AP group A by the switching instruction, discovers the WLAN AP of the WLAN AP group B, the UE 100 can return to the RRC connected mode again and report the discovery to the eNB 200.

The WLAN measurement configuration may be included in the switching instruction. In this case, a WLAN measurement configuration for the RRC idle mode may be defined.

The UE 100 may hold the WLAN measurement configuration in the RRC idle mode only if configuration information to the effect that the WLAN measurement configuration should be held is received from the eNB 200. The eNB 200 may transmit, to the UE 100, the configuration information to the effect that the WLAN measurement configuration should be held, together with the WLAN measurement configuration, or may transmit the configuration information to the UE 100 separately from the WLAN measurement configuration. In addition, the eNB 200 may transmit the configuration information to the effect that the WLAN measurement configuration should be held in a broadcast manner, or may transmit the configuration information in a unicast manner. If the UE 100 does not receive, from the eNB 200, the configuration information to the effect that the WLAN measurement configuration should be held, the UE 100 may discard the WLAN measurement configuration when transitioning to the RRC idle mode.

Alternatively, the UE 100 may receive, from the eNB 200, period information (timer value) indicating a period over which the WLAN measurement configuration should be held. The eNB 200 may transmit the period information to the UE 100 together with the WLAN measurement configuration, or may transmit the period information to the UE 100 separately from the WLAN measurement configuration. In addition, the eNB 200 may transmit the period information in a broadcast manner, or may transmit the period information in a unicast manner. After the UE 100 transitions from the RRC connected mode to the RRC idle mode, the UE 100 holds the WLAN measurement configuration over the period indicated by the period information. Specifically, when the UE 100 transitions to the RRC idle mode, the UE 100 activates a timer corresponding to the period information and holds the WLAN measurement configuration until the timer expires. Upon expiration of the timer, the UE 100 may discard the WLAN measurement configuration.

The UE 100 performs measurement on the WLAN AP group to be measured in the RRC idle mode based on the held WLAN measurement configuration. Then, in the RRC idle mode, the UE 100 may transition (return) from the RRC idle mode to the RRC connected mode based on the discovery or the measurement result of the WLAN AP group to be measured.

Specifically, the UE 100 transitions from the RRC idle mode to the RRC connected mode at a timing when an event specified in the WLAN measurement configuration occurs. In this case, the UE 100 transmits the WLAN measurement report to the eNB 200 in the RRC connected mode.

Alternatively, the UE 100 transitions from the RRC idle mode to the RRC connected mode at a timing when an unreported WLAN AP group to be measured is discovered. In this case, the UE 100 performs the WLAN measurement in the RRC connected mode. The effect obtained by returning to the RRC connected mode and performing the measurement is that the WLAN measurement report can be promptly transmitted to the eNB 200 when the event specified by the WLAN measurement configuration occurs.

Only if the UE 100 receives, from the eNB 200, the configuration information to the effect that the UE 100 should transition to the RRC connected mode, the UE 100 may transition from the RRC idle mode to the RRC connected mode based on the discovery or the measurement result of the WLAN AP group to be measured. That is, the eNB 200 may specify whether to return to the RRC connected mode. The eNB 200 may transmit, to the UE 100, the configuration information to the effect that the WLAN measurement configuration should be held, together with the WLAN measurement configuration, or may transmit the configuration information to the UE 100 separately from the WLAN measurement configuration. In addition, the eNB 200 may transmit the configuration information to the effect that the WLAN measurement configuration should be held in a broadcast manner, or may transmit the configuration information in a unicast manner.

If the UE 100 does not receive, from the eNB 200, the configuration information to the effect that the UE 100 should transition to the RRC connected mode, the UE 100 may not transition from the RRC idle mode to the RRC connected mode based on the discovery or the measurement result of the WLAN AP group to be measured. In this case, the UE 100 may continue the WLAN measurement in the RRC idle mode and perform the UE-based switching control.

In the above embodiment, the LTE system has been exemplified as the WWAN system. However, the present disclosure is not limited to the LTE system. The present disclosure may be applied to a WWAN system other than the LTE system.

Additional Statement (1.1.1) Coexistence with Rel-12 UE-based WLAN interworking.

Solution 3 which is studied in Rel-12 is network-based solution. On the other hand, Rel-12 interworking is UE-based solution. We have to study priority order which entity/function/rule/policy should decide traffic steering.

As a baseline, ANDSF policy has higher priority than RAN rule. AS layer in UE just forward the result of RAN rule to upper layer. And the upper layer decides how to steer traffic to/from WLAN.

From compatibility stand point, this manner should be kept. Rel-13 interworking should just update how the UE AS layer forwards the result to upper layer.

RAN2 should just update how UE AS layer forward RAN related information to upper layer.

In Rel-12 interworking, dedicated parameters are handled by UE in higher priority than broadcasted parameters. For the same reason, this priority order should be reused in Rel-13 interworking enhancement.

Steering command in Rel-13 interworking should be handled as higher priority than result of RAN rule since solution 3 is applicable to UE in RRC connected mode and steering command may be provided via RRC message. Steering command does never conflict with result of RAN rule with dedicated RAN assistance parameters because both steering command and dedicated RAN assistance parameters are provided by the same eNB via dedicated RRC message.

Steering command in Rel-13 interworking enhancement should be handled as higher priority than result of RAN rule.

As current specification of RRC, AS layer forwards information to upper layer. This scheme should be kept. From this perspective, UE should keep dedicated parameters when it receives steering command from eNB, and forward the parameters to upper layer as the same scheme of Rel-12.

UE should keep dedicated parameters when it receives steering command from eNB.

Considering steering command is provided by eNB via RRC message, RRC mechanism should be updated to notify the steering command to upper layer. For example, it is shown in FIG. 14.

If the RRCConnectionReconfiguration message includes the wlan-SteeringCommand and the UE is able to comply with the configuration included in this message, the UE shall perform folioing operations.

The UE should apply the received steeringState.

The UE should forward WLAN-Id-List to upper layers and inform the upper layer of the conditions for steering traffic to/from E-UTRAN from/to WLAN are satisfied for a time interval t-SteeringWLAN about the forwarded WLAN-Id-List.

Idle mode procedure should be modified to avoid current behaviour during the steeringState is wither toLTE or toW-LAN.

The invention claimed is:

1. A radio terminal comprising:
   a controller configured to control traffic steering between an Evolved-Universal Terrestrial Radio Access Network (E-UTRAN) and a Wireless Local Area Network (WLAN), wherein
   the controller is configured to control traffic steering from the E-UTRAN to the WLAN or from the WLAN to the E-UTRAN according to at least one of a first scheme and a second scheme,
   the traffic steering means switching traffic of the radio terminal from one network to another network,
   in the first scheme, the controller is configured to control the traffic steering with assistance of the E-UTRAN,
   in the second scheme, the controller is configured to control the traffic steering in response to an instruction from the E-UTRAN,
   the radio terminal further comprises a receiver configured to receive, from the E-UTRAN, first assistance information to be used to determine whether the radio terminal executes the traffic steering in the first scheme,
   the first assistance information is broadcasted by the E-UTRAN, and
   the receiver is further configured to receive, from the E-UTRAN, WLAN configuration information including a timer value indicating a period over which the WLAN configuration information is held, wherein
   the controller is configured to:
      activate a timer corresponding to the timer value when the radio terminal transitions from an RRC connected mode to an RRC idle mode;
      hold the WLAN configuration information until the timer expires; and
      discard the WLAN configuration information upon expiration of the timer, and wherein
   the controller is further configured to stop controlling the traffic steering according to the first scheme in response to reception of the instruction.

2. The radio terminal according to claim 1, wherein the controller is configured to control the traffic steering according to the first scheme in response to the fact that the radio terminal is in an RRC idle mode.

3. The radio terminal according to claim 1, wherein the controller is configured to control the traffic steering according to the first scheme until the controller receives the instruction.

4. The radio terminal according to claim 1, wherein the controller is configured to prioritize the instruction over a result of the determination based on the first assistance information.

5. The radio terminal according to claim 1, wherein the controller has an upper entity,
   the instruction is configured to indicate switching from the E-UTRAN to the WLAN, and comprises an identifier related to the WLAN, and
   the controller is configured to notify the upper entity of an indicator indicating switching from the E-UTRAN to the WLAN together with the identifier related to the WLAN.

6. The radio terminal according to claim 1, wherein the first assistance information comprises an identifier related to the WLAN, and
   the controller is configured to control the traffic steering by using the identifier related to the WLAN, based on radio quality in the WLAN and the E-UTRAN.

7. The radio terminal according to claim 1, wherein the controller is configured to execute the traffic steering from the E-UTRAN to the WLAN according to the instruction, and
   the radio terminal further comprises a transmitter configured to transmit, to the E-UTRAN, an acknowledge relay or a negative rely to the instruction.

8. A radio terminal comprising:
   a controller configured to control traffic steering between an Evolved-Universal Terrestrial Radio Access Network (E-UTRAN) and a Wireless Local Area Network (WLAN), wherein
   the controller is configured to control traffic steering from the E-UTRAN to the WLAN or from the WLAN to the E-UTRAN according to at least one of a first scheme and a second scheme,
   the traffic steering means switching traffic of the radio terminal from one network to another network,
   in the first scheme, the controller is configured to control the traffic steering with assistance of the E-UTRAN,
   in the second scheme, the controller is configured to control the traffic steering in response to an instruction from the E-UTRAN,
   the radio terminal further comprises a receiver configured to receive, from the E-UTRAN, first assistance information to be used to determine whether the radio terminal executes the traffic steering in the first scheme,
   the first assistance information being broadcasted by the E-UTRAN,
   the receiver is further configured to receive, from the E-UTRAN, WLAN configuration information including a timer value indicating a period over which the WLAN configuration information is held, and
   the controller is configured to:
      activate a timer corresponding to the timer value when the radio terminal transitions from an RRC connected mode to an RRC idle mode;
      hold the WLAN configuration information until the timer expires; and
      discard the WLAN configuration information upon expiration of the timer, wherein
   the first scheme is a scheme in which the radio terminal starts the control of the traffic steering by using the first assistance information, based on radio qualities in the WLAN and the E-UTRAN, even without an instruction from the E-UTRAN, and the second scheme is a scheme in which the radio terminal starts the control of the traffic steering with a traffic steering instruction from the E-UTRAN as a trigger.

9. A processor configured to control a radio terminal, wherein the processor is configured to perform a first process of controlling traffic steering between an Evolved-Universal Terrestrial Radio Access Network (E-UTRAN) and a Wireless Local Area Network (WLAN), in the first process,
the processor is configured to control traffic steering from the E-UTRAN to the WLAN or from the WLAN to the E-UTRAN according to at least one of a first scheme and a second scheme,
the traffic steering means switching traffic of the radio terminal from one network to another network,
in the first scheme, the processor is configured to control the traffic steering with the assistance of the E-UTRAN,
in the second scheme, the processor is configured to control the traffic steering in response to an instruction from the E-UTRAN,
the processor is configured to perform:
a second process of receiving, from the E-UTRAN, first assistance information to be used to determine whether the radio terminal executes the traffic steering in the first scheme, the first assistance information being broadcasted by the E-UTRAN;
a third process of receiving, from the E-UTRAN, WLAN configuration information including a timer value indicating a period over which the WLAN configuration information is held; and
a fourth process of:
activating a timer corresponding to the timer value when the radio terminal transitions from an RRC connected mode to an RRC idle mode;
holding the WLAN configuration information until the timer expires; and
discarding the WLAN configuration information upon expiration of the timer, wherein
the processor is further configured to stop controlling the traffic steering according to the first scheme in response to reception of the instruction.

10. A communication method comprising:
controlling, by a radio terminal, traffic steering between an Evolved-Universal Terrestrial Radio Access Network (E-UTRAN) and a Wireless Local Area Network (WLAN), wherein
in the controlling, the radio terminal controls traffic steering from the E-UTRAN to the WLAN or from the WLAN to the E-UTRAN according to at least one of a first scheme and a second scheme,
the traffic steering means switching traffic of the radio terminal from one network to another network,
in the first scheme, the radio terminal controls the traffic steering with assistance of the E-UTRAN,
in the second scheme, the radio terminal controls the traffic steering in response to an instruction from the E-UTRAN,
the communication method further comprises:
broadcasting, by the E-UTRAN, first assistance information to be used to determine whether the radio terminal executes the traffic steering in the first scheme; and
receiving, by the radio terminal, the first assistance information from the E-UTRAN, the communication method further comprises:
transmitting, by the E-UTRAN, WLAN configuration information including a timer value indicating a period over which the WLAN configuration information is held;
receiving, by the radio terminal, the WLAN configuration information and the timer value from the E-UTRAN;
activating, by the radio terminal, a timer corresponding to the timer value when the radio terminal transitions from an RRC connected mode to an RRC idle mode;
holding, by the radio terminal, the WLAN configuration information until the timer expires; and
discarding, by the radio terminal, the WLAN configuration information upon expiration of the timer, and wherein
the communication method further comprises:
stopping, by the radio terminal, the control of the traffic steering according to the first scheme in response to reception of the instruction.

* * * * *